(12) United States Patent  
Yamada

(10) Patent No.: US 7,580,562 B2  
(45) Date of Patent: Aug. 25, 2009

(54) IMAGE PROCESSING METHOD, IMAGE PROCESSING DEVICE, AND IMAGE PROCESSING PROGRAM

(75) Inventor: Kazumi Yamada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 644 days.

(21) Appl. No.: 11/214,816

(22) Filed: Aug. 31, 2005

(65) Prior Publication Data

US 2006/0067575 A1 Mar. 30, 2006

(30) Foreign Application Priority Data

Sep. 21, 2004 (JP) .............................. 2004-273371

(51) Int. Cl.
G06K 9/00 (2006.01)
G06K 9/62 (2006.01)
H04N 1/40 (2006.01)

(52) U.S. Cl. ....................... 382/165; 382/224; 382/305; 358/2.1; 358/3.01

(58) Field of Classification Search ................. 382/162, 382/164, 165, 169, 176–180, 181, 224–230, 382/305–306; 358/2.1, 3.01
See application file for complete search history.

(56) References Cited

U.S. PATENT DOCUMENTS 4,636,845 A * 1/1987 Alkofer ....................... 358/522
4,962,433 A * 10/1990 Matsushima ............... 358/3.01
5,072,305 A * 12/1991 Numakura et al. ......... 358/3.01
5,717,605 A * 2/1998 Komiya et al. .............. 356/406
5,963,670 A * 10/1999 Lipson et al. ................ 382/224
6,360,006 B1* 3/2002 Wang .......................... 382/162
6,389,162 B2* 5/2002 Maeda ........................ 382/172
6,549,660 B1* 4/2003 Lipson et al. ................ 382/224
6,985,628 B2* 1/2006 Fan ............................. 382/224
6,988,093 B2* 1/2006 Pic et al. ......................... 707/1
2003/0048487 A1* 3/2003 Johnston et al. ............. 358/474
2003/0174179 A1* 9/2003 Suermondt et al. .......... 345/853
2004/0076337 A1* 4/2004 Nishida ....................... 382/274

FOREIGN PATENT DOCUMENTS

JP 2004-104662 A 4/2004

* cited by examiner

*Primary Examiner*—Daniel G Mariam
*Assistant Examiner*—Manav Seth
(74) *Attorney, Agent, or Firm*—Sughrue Mion, PLLC

(57) ABSTRACT

When making judgments of image type, image data is input, and a judgment is made as to whether the type of image indicated by the image data is a first type; for image data judged as being of the first type, a judgment is made as to whether the image is of a second type. For image data not judged as being of the first type, a judgment is made as to whether the image is of a second type.

3 Claims, 16 Drawing Sheets

FIG.1
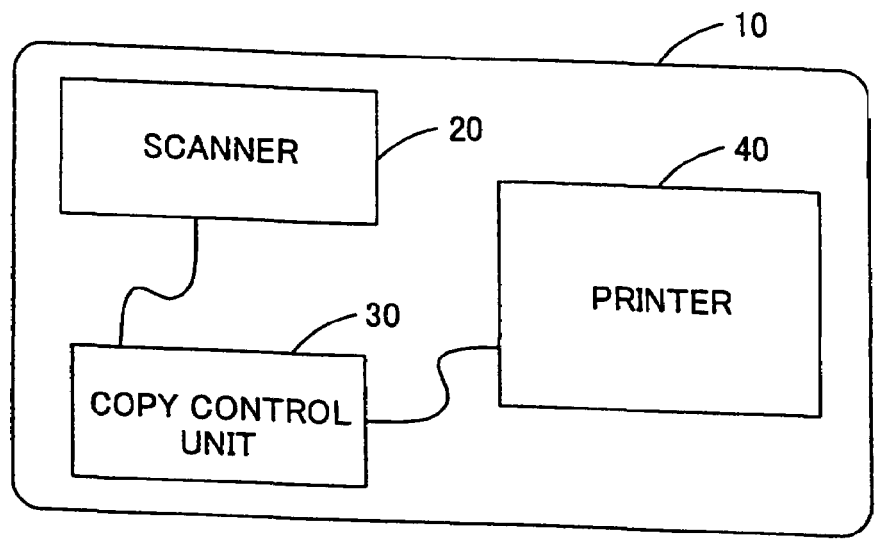
(a)
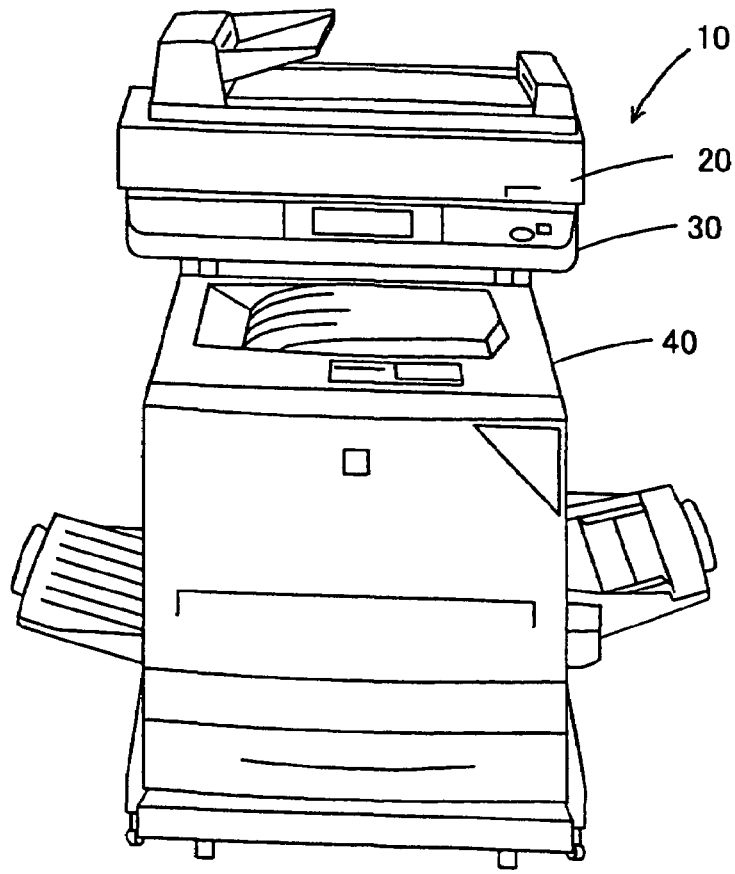
(b)

FIG. 10
(a)
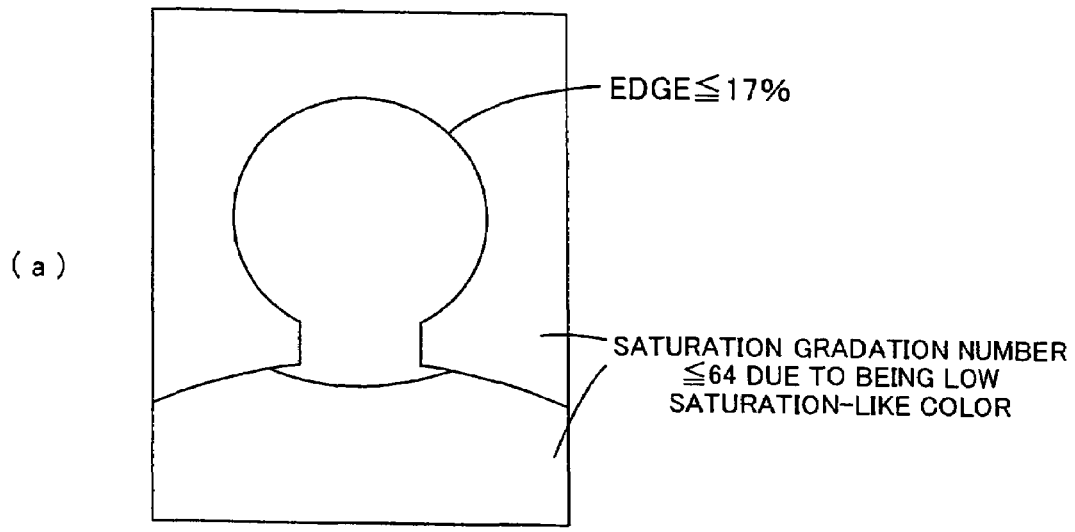
EDGE ≦ 17%
SATURATION GRADATION NUMBER ≦ 64 DUE TO BEING LOW SATURATION-LIKE COLOR
(b)
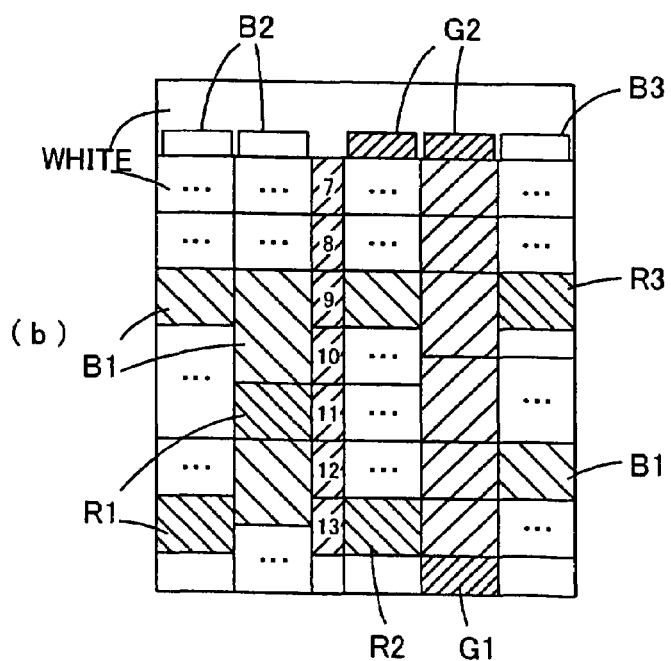

IMAGE PROCESSING METHOD, IMAGE PROCESSING DEVICE, AND IMAGE PROCESSING PROGRAM

BACKGROUND OF THE INVENTION

1. Field of the Invention

The present invention relates to an image processing method, an image processing device, and an image processing program.

2. Description of the Related Art

In copiers and similar devices, there is known in the art an approach whereby during scanning of an original document to create digital data, text portions and photograph portions of an image are distinguished, and on the basis of the distinction, image processing of the different portions is carried out (see Unexamined Patent Application 2004-104662, for example).

SUMMARY OF THE INVENTION

Various technologies, including that of Patent Citation 1 above, have been developed as processes for distinguishing between text portions and image portions, but it has proven difficult to attain highly accurate judgments. For example, in Patent Citation 1 above, a process is eliminate the effects of bleed is performed, the image is binarized, and it is judged whether the edge pattern matches a certain pattern, in order to judge whether it is text of a photograph. When a specific criterion is used to distinguish between text and photographs in this way, while it is possible to distinguish with a high degree of accuracy for certain specific images, images have various kinds of features, and it is extremely difficult to conduct error-free judgments on the basis of image features with specific criteria only.

With the foregoing in view, it is an object of the present invention to provide an image processing method, image processing device, and image processing program able to accurately judge image type.

To achieve the stated object, in the present invention, images are judged on the basis of at least two judgment criteria, and even where an image is judged in a first judgment step as being of a first type, an additional judgment as to whether it is of a second type is made by a second judgment step. Accordingly, even if an erroneous judgment is made by the first judgment step, so that an image which is actually of the second type is judged as being of the first type, that erroneous judgment can be corrected by the second judgment step, making it possible to correctly judge image type.

Specifically, in the first judgment step, a feature of images of the first type is extracted, and using a first criterion indicating this feature an judgment is made as to whether the image is of the first type; however, in consideration of all of the image types that meet the first criterion, while images of the first type will be included among these, it is difficult to completely exclude those of the second type. Accordingly, even images judged as being of the first type may include another type, namely, a second type.

Thus, while erroneous judgment can occur with the first judgment step, in the present invention, image data judged as being of the first type is subjected to additional judgment by the second judgment step, whereby it is possible to correctly judge whether an image of a second type that meets the first criterion is in fact of the second type. Here, in the second judgment step, a feature of images of the second type is extracted, and on the basis of a certain second criterion indicating this feature it is judged whether the image is of the second type.

In the second judgment step, since it suffices to be able to correctly judge that an image of the second type judged as being of the first type is in fact of the second type, it is possible to make the second criterion more stricter. Specifically, it is acceptable to be able to judge that an image is of the second type, not based on a criterion that broadly meets a feature in images of the second type (designated as Criterion A), but rather under conditions where the image that meets a first criterion used to judge whether it is of the first type, but is actually of the second type. Since the criterion for making this judgment can be a condition that is more strict than Criterion A, by employing the stricter condition as the second criterion in the second judgment step, erroneous judgments can be reduced more efficiently.

Specifically, if in the second judgment step it is merely judged whether image type is the second type on the basis of a loose condition (Criterion A), a significant number of images of the first type will be included among images judged as being of the second type. However, conditions under which an image that meets the first criterion is actually an image of the second type are limited. Accordingly, it is sufficient to be able to target only images of the second type that also happen to meet the first criterion, and to be able to judge that this image is of the second type, and thus this can function as a condition stricter than Criterion A. As a result, image type can be judged more accurately.

Here, in the image data input step, it is sufficient for an image to indicate image content, it being possible for example to employ data that represents colors of multiple pixels as gradation values of each color component. Various arrangements can be employed as arrangements for input of image data, it being possible to implement data of various kinds, such as image data indicating content scanned by an image scanning device, image data indicating an image shot by a digital camera or the like, or images created with application programs of various kinds.

With regard to image type, it is sufficient to be able to classify whether content common to images is included. Specifically, it is sufficient to classify different image content into at least a first type and a second type. For example, images that include artificially created images such as text, lines, patterns or the like, and images that include natural images such as photographs taken of trees, mountains, buildings, or other landscape scenes can be classified as different types. Where both kinds of images are included, an image may be classified as either type depending on which it most closely approximates.

In the present invention, either an image type that includes an artificially created image or an image type that includes a natural image is designated as the first type, with the other designated as the second type. Specifically, it is possible to employ arrangement wherein by the first judgment step it is judged whether the image type is one that includes an artificially created image, and by the second judgment step it is judged whether the image type is one that includes a natural image. It is also possible to employ arrangement wherein by the first judgment step it is judged whether the image type is one that includes a natural image, and by the second judgment step it is judged whether the image type is one that includes an artificially created image.

Where image type can be judged in the above manner, there can be arranged a method or a device able to further carry out image processing appropriate to the image type in question. That is, where some kind of processing is carried out using image data, it is often the case that image processing is carried out to modify the image data per se. For example, depending on image type, an image scanned by an image scanning device may be subjected to edge enhancement or contrast adjustment; or a color conversion or halftone process may be carried out for the purpose of carrying out printing based on the image data. When carrying out such image processing, by modifying the parameters or processing algorithm for each image type, appropriate picture quality can be produced on an image type-by-type basis, processing speed appropriate for each image can be realized, and desired image processing on a type-by-type basis can be achieved.

Of course, image processing is not limited to the above. For example, it is possible to employ an arrangement wherein a preview scan is performed in the image scanning device, and on the basis of the image data obtained thereby, the image type judged and reflected in the full scan. Specifically, the image data proper obtained in the full scan can be subjected, in a manner appropriate to image type, to a tone curve, contrast adjustment, sharpness enhancement, and the like, to obtain favorable image data proper on an image type-by-type basis. Here, the preview scan is a scan carried out at a certain preliminary scan resolution; typically, the scan resolution set during the full scan is a higher resolution. Accordingly, in an arrangement whereby image type is judged on the basis of image data during a preview scan, the process can be carried out faster as compared to where an image is judged based on image data during a full scan.

It is possible to employ an arrangement whereby if an image is not judged as being of a first type in the first judgment step, it is deemed to be of a second type. Specifically, on the assumption that there are two image types, an image not judged as being of the first type is deemed to be of the second type. Of course since in this case as well it is possible that the judgment of the first judgment step is an incorrect judgment, in preferred practice a judgment process to prevent incorrect judgment will be carried out in the second judgment step. If the result is a judgment that the image is of the second type, this means that the judgment of the first judgment step was an incorrect judgment, and the incorrect judgment can be corrected in order to correctly judge the image type.

It suffices to be able to judge image type in the first judgment step and the second judgment step; while judgments can be made using only a single criterion for judging each image type, in preferred practice multiple criteria will be used. That is, multiple criteria, rather than a sole criterion, can be posited for judging image type, and where image type is judged on the basis of multiple criteria, it is possible to make more accurate judgment of image type.

When judging image type, the target for analysis may be limited. For example, it is possible to possible to employ an arrangement whereby the pixels for analysis consist of pixels in image data, from which pixels of maximum brightness and pixels of minimum brightness have been excluded. Specifically, when pixel colors are represented by multiple gradation values, it is often the case that pixels of maximum brightness and minimum brightness thereof have brightness and minimum brightness due to noise or limited representational power, rather than indicating actual image color. In particular, in image data obtained by scanning an original document with an image scanning device, pixels of maximum brightness and minimum brightness are fairly rare, and in most instances do not contribute appreciably to gradation representation within an image. Accordingly, by excluding pixels of maximum brightness and minimum brightness from the pixels for analysis, and designating the remaining pixels as the pixels for analysis, it is possible to analyze areas of significant gradation representation in image data.

In an image having black text formed on a white background, on the other hand, where it is assumed that the white background portions are of maximum brightness and the black text portions are of minimum brightness, where the pixels for analysis as a proportion of all pixels falls below a certain criterion, it is possible to judge the image type as being one that includes an artificially created image. That is, on the basis of this assumption, a majority of pixels in an image having black text formed on a white background will be pixels of maximum brightness or minimum brightness.

Conversely, in the case of an image like a natural image, it is rare that a majority of pixels will be pixels of maximum brightness or minimum brightness. Accordingly, where the pixels for analysis as a proportion of all pixels falls below a certain criterion, it is possible to judge the image type as being one that includes an artificially created image. Of course, here it suffices to be able to establish a criterion for the purpose of judging image type with attention to maximum brightness and minimum brightness; conversely, it is also possible to have pixels of maximum brightness and minimum brightness constitute the pixels for analysis.

As examples of criteria for judging image type, it is possible to employ various other criteria as well. For example, it is possible to employ an arrangement whereby in the event that the number of gradations included in an image is below a certain criterion, the image type is judged as being one that includes an artificially created image. Specifically, image data typically represents pixel color components in terms of gradation values, and gradations included in an image can be defined. In an artificially created image, it is often the case that color of an area in the image is decided upon artificially during the creation process, and it is rare that the entire gradation value range is used without interruption.

In a natural image, on the other hand, since colors of various kinds are present, it is common for colors to be specified by a very wide range of gradation values. Accordingly, by using the number of gradations included in an image as a criterion, it is possible to determine whether or not an image has been artificially created. Of course, it is possible to employ various arrangements for calculating gradation number. For example, a histogram can be calculated for gradation values of pixels, and gradation values whose frequency in the histogram is not "0" or essentially "0" can be counted. Where pixels other than those of maximum brightness or minimum brightness are selected as pixels for analysis, gradation number can be calculated exclusive of maximum brightness or minimum brightness, and a criterion established for gradation number so calculated.

Here, gradation values are established for each color component; image gradation number judged by either the first judgment step or the second judgment step may consist of the gradation number for each color component in question; or it is also acceptable to analyze gradation number of converted gradation values, once the gradation values in image data have been initially converted to gradation values in another color system. For example, it would be possible to calculate a color value such as brightness, saturation, hue etc. from a color system that includes RGB (red, green, blue) or CMY (cyan, magenta, yellow) or other chromatic color components, and to judge image type with reference to gradation number of the color value in question. Gradation numbers of either chromatic color components or color values such as those mentioned above may be used in judgment of image type. For example, it is possible to employ an arrangement whereby the sum of gradation values for RGM color components and brightness is calculated, and if the gradation number is below a certain criterion, the image type is judged as being one that includes an artificially created image.

It is also acceptable to use a statistical index of a characteristic quantity as a criterion for judging image type. Specifically, where image data is used, there can be calculated characteristic quantities of various kinds that indicate characteristics of images, and once characteristic quantities have been calculated, there can then be calculated statistical indices that indicate a trend or quality of a group of characteristic quantities in question. Since the characteristics of images can be analyzed using the statistical indices in question, image type can be judged as a result of the analysis. A statistical index is useful when analyzing behavior of a group of characteristic quantities; in preferred practice, a certain criterion will be established on the basis of a statistical index for the purpose of judging natural images, which tend to include numerous gradations.

It suffices for a characteristic quantity to be a value that indicates a characteristic of an image; values may be calculated from image data. For example, it would be possible to employ values of various kinds, such as values indicating edge intensity or edge pattern in an image, or differences among color values or color component values of pixels making up an image. As statistical indices, it would be possible to employ indices of various kinds for the purpose of analyzing characteristic quantity distributions, such as a histogram of a characteristic quantity of pixels; the scatter or standard deviation of the histogram; or pixels included in a value range with characteristic quantity, as a proportion of total pixels. Where pixels other than those of maximum brightness or minimum brightness are used as pixels for analysis, a characteristic quantity may be calculated for pixels exclusive of those of maximum brightness or minimum brightness, and a criterion established for the statistical index of that characteristic quantity.

As a more specific example, it would be possible to employ an arrangement whereby pixels with a characteristic quantity indicating an edge (hereinafter termed edge pixels) are calculated as a proportion of total pixels, and where this proportion is less than a certain criterion, the image type judged as being one that includes a natural image. Specifically, in image types that include text or other such artificially created images, most of the image is enclosed by distinct edges, such as black text on a white background. In a natural image, on the other hand, while sharp edges are present, continuous color changes (non-edge portions) are present in most parts of the image.

Accordingly, while typically many definitive edges are present in an image created artificially, in comparison, an image with few edge pixels is highly likely to be a natural image. Accordingly, where a certain criterion value is pre-established for edge pixels as a proportion of the total, in the event that the actual proportion is smaller than this criterion value, the image can be judged as being a natural one. Various methods could be used in order to decide whether or not pixels are edge pixels. For example, it would be acceptable to extract edge pixels by means of a filter such as a Sobel filter or a Prewitt filter; or to determine that a pixel is an edge pixel if the difference in gradation value between a pixel of interest and a neighboring pixel exceeds a certain threshold value; and various arrangements may be employed.

It is also acceptable to judge image type on the basis of edge pixels as a proportion of the total, in combination with histogram distribution. Specifically, since a natural image includes relatively numerous gradation values as compared to an artificially created image, gradation values indicating pixel color, for example, a histogram for brightness or the like, could be calculated, and by judging whether the range of distribution thereof is greater than a certain criterion, it can be judged whether the image type is one that includes a natural image. When judgment is made in combination with the proportion of edge pixels, image type can be judged more reliably. Here, it suffices to be able to evaluate the spread of a distribution; standard deviation, scatter, or the like could be employed.

It is also acceptable to judge image type by means of average brightness in an image. Specifically, in many instances, the background of text or other such artificially created image is white, and since the brightness of the white background is very bright, average brightness for an image of this kind tends to be high. Accordingly, by establishing a certain criterion for average value of brightness, when average brightness is lower than this certain criterion, image type can be judged as one that includes a natural image.

It is also acceptable to judge image type based on saturation in an image. Specifically, in an image having black text formed on a white background, since the ground color and text are achromatic color, much low-saturation color is included. Accordingly, by calculating low-saturation pixels as a proportion of the total, and judging whether this proportion is greater than a certain criterion, it can be judged whether image type is one including an artificially created image.

Additionally, once images have been classified into first type or second type, it is acceptable to carry out finer classification of each type. Specifically, in the image processing method of the present invention, after image type has been judged, an image processing step is carried out to subject the image data indicating the judged image is subjected to image processing. At this time, image processing appropriate to each image type is carried out, but even for images of the same type, when carrying out image processing after judging image type, it is preferable to apply different image processes in some instances. Accordingly, images of the same type are classified in more detail into sub-classes, and image processing appropriate to each sub-class is carried out.

In the image processing step, after image type has been judged, it suffices to be able to carry out image processing on image data indicating the judged image; the image data may be that input in the aforementioned image data input process, or other image data. For example, by the means of the image data input step, image data could be created during a preview scan, and image data created by a full scan processed by means of the image processing step.

As an example of sub-class, there can be cited an example in which sub-classes are defined by whether color is distributed disproportionately, so as to be able to apply different image processing to images of the same kind, depending on the extent of disproportionate color distribution. Specifically, where ground color is a chromatic color, if image processing that produces gradation value shifts is carried out without consideration of color balance, ground color will wind up being altered in association with the shift in gradation value. Accordingly, processing is carried out differently for an image with disproportionately distributed color, than for images without disproportionately distributed color.

Specifically, by comparing a chromatic color component with a certain criterion component, it can be judged whether a specific chromatic color is distributed disproportionately. As the criterion component, it suffices that the component be one that indicates a general tendency of the chromatic color component; the average value of brightness could be employed, for example. Where the difference between this average value of brightness and the average value of a color component is greater than a certain criterion, disproportionate color distribution (color seepage) may be determined to exist. Of course, it would be possible to employ various other arrangements as the arrangement for judging disproportionate color distribution.

For an image that has been classified into the sub-class indicating that a specific chromatic color is distributed disproportionately, the image is subjected by the image processing step to image processing that changes the multiple color components by a level of change that is uniform for the color components. By so doing, color adjustment can be performed without disrupting color balance, and disproportionately distributed color can be preserved. For an image not classified into the sub-class indicating that a specific chromatic color is distributed disproportionately, image processing to change the color component for each of the multiple color components is carried out by the image processing step. In this case, gradation can be adjusted on a color component-by-component basis. Correction by means of a tone curve (including contrast adjustment) can be cited as an example of image processing to change color components by a certain level of change.

Additionally, when changing color components by means of the image processing step, there are certain instances in which it is preferable to retain gradation for color in a high brightness range and color in a low brightness range; and other instances in which it is preferable to convert some pixels to maximum brightness or minimum brightness so as to distinctly represent white and black. Accordingly, an image classified into the sub-class indicating that no specific chromatic color is distributed disproportionately may be deemed an image having text or the like formed on a white background, and image processing carried out so as to distinctly represent white and black. Specifically, color components are changed while converting pixels in a certain high brightness range to maximum brightness, and converting pixels in a certain low brightness range to minimum brightness, to definitively convert pixels corresponding to white and black to white and black. As a result, an image in which text or the like is crisply represented can be obtained.

It would be acceptable to define a high brightness range such that an image can be rendered crisp by means of conversion to white; and to decide in advance upon a criterion brightness. For example, where it is desired to reliably convert a ground color of light color (such as recycled paper) to white, a high brightness range that would include the brightness of the ground color of typical recycled paper would be established. With regard to low brightness, it would be acceptable to define a range such that text or similar images can be rendered crisp by means of conversion to black, at the expense of pixel gradation in this range; and to decide in advance upon a criterion brightness. For example, in a typical image scanning device, since scanning results of black text is not necessarily limited to low brightness, a low brightness range may be established so as to include scanning results of black text.

Additionally, where contrast enhancement or the like is posited as image processing that changes color components, if contrast enhancement were carried out uniformly across the board while ignoring image sub-class, there is a risk that high brightness and low brightness gradations will become compressed. In a natural image, compression of high brightness and low brightness gradations particularly stands out as degraded picture quality. Accordingly, in preferred practice a natural image that includes many areas of high brightness or low brightness will be assigned to a sub-class different from that of a natural image that does not include many areas of high brightness or low brightness.

Specifically, it is judged whether the average value of image brightness meets a certain criterion, as well as judging whether the spread of the distribution of the brightness histogram meets a certain criterion. That is, by means of the average value of image brightness it is judged whether appreciable areas of high brightness or low brightness are included; and from, the spread of the distribution of the brightness histogram it is judged whether the image is a natural one. By means of these judgments, processing that would compress high brightness in a natural image that includes appreciable areas of high brightness can be prevented, and processing that would compress low brightness in a natural image that includes appreciable areas of low brightness can be prevented.

In this way, in natural images as well, by analyzing image brightness in detail, it can be judged whether or not compression of high brightness gradations to a certain extent would be preferable. That is, where the background in a natural image is extremely light (e.g. where an image has been shot of a subject together with a white background), high brightness gradations in the image can be sacrificed to a certain extent. Accordingly, it is distinguished on the basis of the average value of image brightness whether the image includes particularly numerous pixels of high brightness, and if so the image is classified into a sub-class indicating particularly high brightness.

For images assigned in this sub-class, image processing is carried out to change the color components while converting pixels in a certain high brightness range to maximum brightness, to a certain extent. As a result, the background can be made white reliably. As the high brightness range, it suffices to define a high brightness range within the image; a high brightness range may be defined so as to include a given proportion of pixels towards the high brightness end. Of course, for images not assigned to this sub-class, in preferred practice color components are changed without converting all pixels in a high brightness range to maximum brightness, and to effect conversion so as to preserve tonality in the high brightness range.

The image processing method set forth above may embody the idea of the invention in various forms, such as being worked in a single device or worked together with another method in a state of being incorporated into a certain machine; and may be modified appropriately. Of course, the invention may also be reduced to practice as an image processing device. When working the invention, a certain program or programs may be executed by devices of various kinds. The invention may also be reduced to practice as such a program.

It is possible to use storage media of any kind to provide a program. For example, magnetic recording media and magnetooptical recording media are acceptable; and any recording media that may be developed in the future may be considered similarly. The idea of the invention differs nowise where realized in part through software and in part through hardware; and a form where portions are recorded onto a storage medium and read out as needed would be encompassed as well.

BRIEF DESCRIPTION OF THE DRAWINGS

FIG. 1 is an illustration showing a copier.

FIG. 10 is an illustration depicting the advantage of making a second judgment.

DETAILED DESCRIPTION

Figure 2:
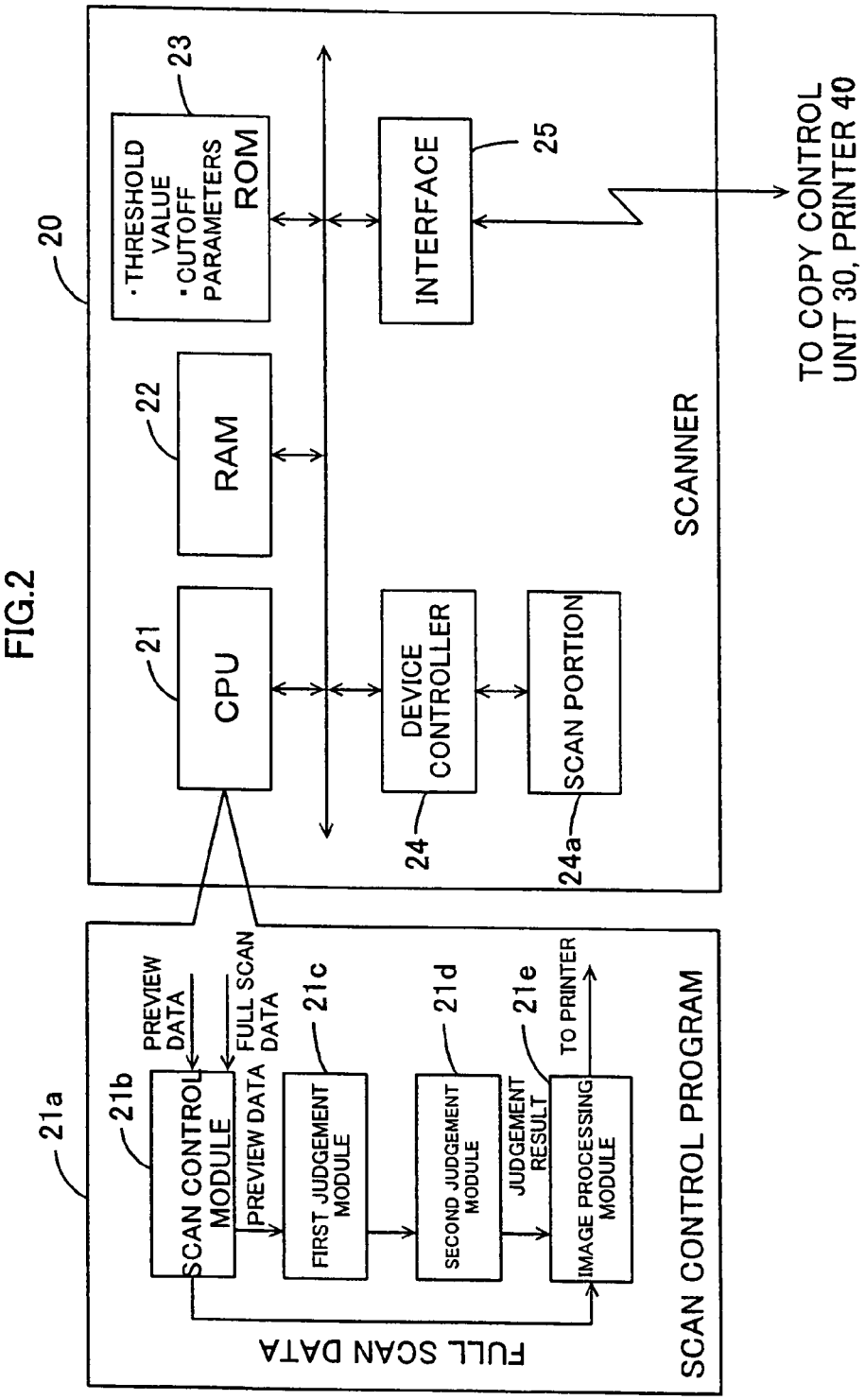
FIG. 2 is a block diagram of a scanner.

The following description of the embodiments of the invention is made in the order indicated below.
(1) Arrangement of Copier:
(2) Copy Process:
    (2-1) Parameter Calculation Process:
    (2-2) Judgment Process:
    (2-3) Cutoff Value Decision Process:
(3) Other Embodiments:
    (1) Arrangement of Copier:

FIG. 1 is an illustration showing a copier 10 embodying the image processing device which pertains to the invention. FIG. 1(*a*) is a simplified schematic of the copier 10, and FIG. 1(*b*) is an illustration showing the exterior of the copier. As shown in the drawing, the copier 10 pertaining to this embodiment of the invention is composed of a scanner 20, a printer 40, and a copy control unit 30 connected to these.

FIG. 2 is a block diagram of the scanner 20. The scanner 20 is a device that, when an original is set in the ADF (Auto Document Feeder), transports it to an original document scanning portion, where the image on an original document is scanned. At this time, the scanned image is represented by image data. In image data in this embodiment, the image is made up of a plurality of pixels, with RGB (red, green blue) color density of each pixel being represented with 256 levels of gradation. The scanner 20 comprises a CPU 21, RAM 22, and ROM 23, with the CPU 21 executing a control program stored in the ROM 23, while using the RAM 22 as work memory. Scanning operation in the scanner is achieved in this way.

Specifically, the scanning portion 24*a* comprises a light source (LED or the like) for illuminating the original; a sensor (CCD or the like) for sensing the reflected light; and an original document conveyor mechanism. The CPU 21 controls the scanning portion 24*a* through a device controller 24. By so doing, transport of the original and digitalization of content recorded on the original are carried out. That is, RGB image data is created. An interface 25 sends data of various kinds to the copy control unit 30 through connection lines, and carries out processes such as sending image data by means of processing by the CPU 21, and handling instructions from the copy control unit 30.

During scanning by the CPU 21, a scan control program 21*a* that includes the image judgment process of the invention is carried out. In FIG. 2, a functional block diagram of the scan control program 21*a* is shown at left; as shown in the drawing, this program comprises a scan control module 21*b*, a first judgment module 21*c*, a second judgment module 21*d*, and an image processing module 21*e*.

The scan control module 21*b* is responsible for the process that controls the scanning portion 24*a* via the device controller 24; it acquires image data of the image of the original document placed on the document stage, at the scanning resolution instructed by the copy control unit 30 described later. The scanning resolution may be set to various resolutions; in this embodiment, in the course of a single copy operation, two scans, namely, a preview scan and a full scan, are carried out. Here, the preview scan is carried out at lower resolution than the full scan, and the process finishes faster. The full scan is the scan that generates the original data for printing the image.

In this embodiment, by means of processing by the first judgment module 21*c* and the second judgment module 21*d*, an image for copying is clipped out from the image data obtained with the preview scan (preview data), and the type and sub-class of the image are judged. Accordingly, in this embodiment the process in the scan control module 21*b* corresponds to the image data input step mentioned previously. In this embodiment, the first judgment module 21*c* judges whether the image type is of a type including text (this includes artificially created lines, patterns, and other images as well, but is referred to herein as text), while the second judgment module 21*d* judges whether the image type is a type that includes a photograph (natural image).

For an image not judged by the first judgment module 21*c* as being of a type that includes text, the second judgment module 21*d* judges whether the image is a photograph; or in the event that the image has been judged by the first judgment module 21*c* as being of a type that includes text, performs a recheck as to whether it is of photograph type. Accordingly, even in the event of an erroneous judgment by the first judgment module 21*c* that an image does not include text, it can nevertheless be determined that the image truly does include a photograph, and more accurate judgments can be made. Or, in the event of an erroneous judgment by the first judgment module 21*c* that an image includes text, it can nevertheless be determined that the image truly does not include a photograph, and more accurate judgments can be made.

In the first judgment module 21*c*, even where an image includes text, it is further classified into a sub-class depending on whether the image has color cast; and in the second judgment module 21*d*, even where an image includes a photograph, it is further classified into a sub-class depending on the level of brightness of the image overall.

The image processing module 21*e* carries out a contrast enhancement process and a sharpness enhancement process on image data created by the full scan (full scan data). At this time, the image processing module 21*e* carries out image processing appropriate to the particular sub-class determined by the first judgment module 21*c* and the second judgment module 21*d*. The image processed data is handed over to the printer 40 via the interface 25.

Data needed when carrying out judgment of image type and image processing has been previously recorded in the ROM 23. Specifically, the first judgment module 21*c* and the second judgment module 21*d* make judgments utilizing various threshold values, described later. Threshold value data indicating these threshold values is recorded in the ROM 23. When the image processing module 21*e* performs contrast enhancement, a gradation value range smaller than a cutoff value in shadow portions and a gradation value range greater than a cutoff value in highlight portions are ignored, with cutoff parameters determined in advance for each sub-class, for the purpose of calculating these cutoff values, being recorded in the ROM 23.

Figure 3:
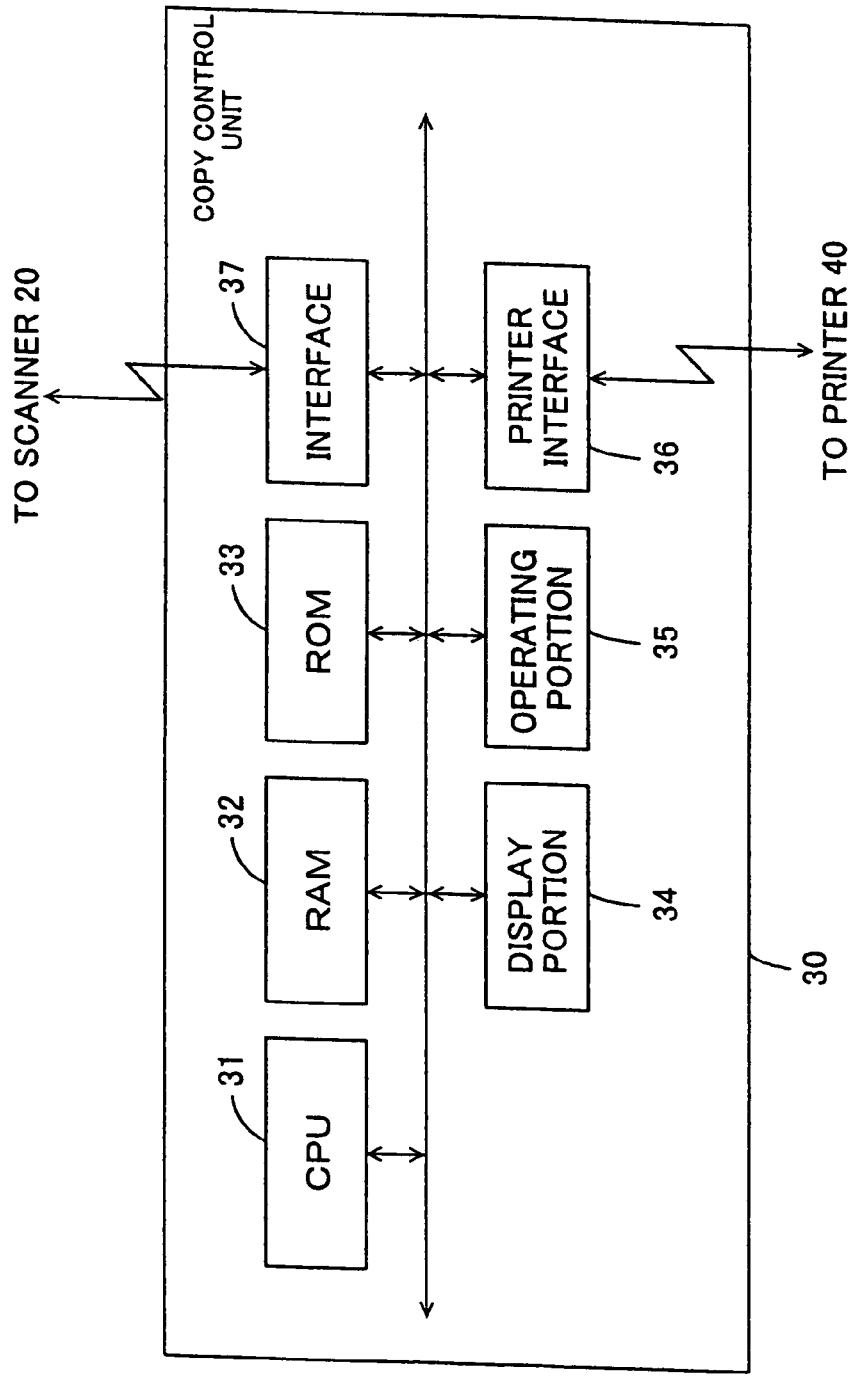
FIG. 3 is a block diagram of a copy control unit

FIG. 3 is a block diagram of the copy control unit 30. Like the scanner 20, the copy control unit 30 comprises a program execution environment of a CPU 31, RAM 32, and ROM 33, with the CPU 31 executing a control program stored in the ROM 33, while using the RAM 32 as work memory. The copy control unit 30 provides the user with copy conditions and the like, and is responsible for the process of handling control inputs by the user.

For this reason, there are provided a display portion 34 (LCD etc.) for presenting to the user information such as original document type, printing paper size and so on, a control portion 35 (push buttons, a touch panel, or the like) enabling the user to input desired information, a printer interface 36 and an interface 37. The CPU 31 performs control of the display portion 34 and the control portion 35, carrying out processes to provide the user with needed information and to handle resolution instructions, Copy Start instructions, and so on. Instructions so obtained are output to the scanner 20 or printer 40.

Figure 4:
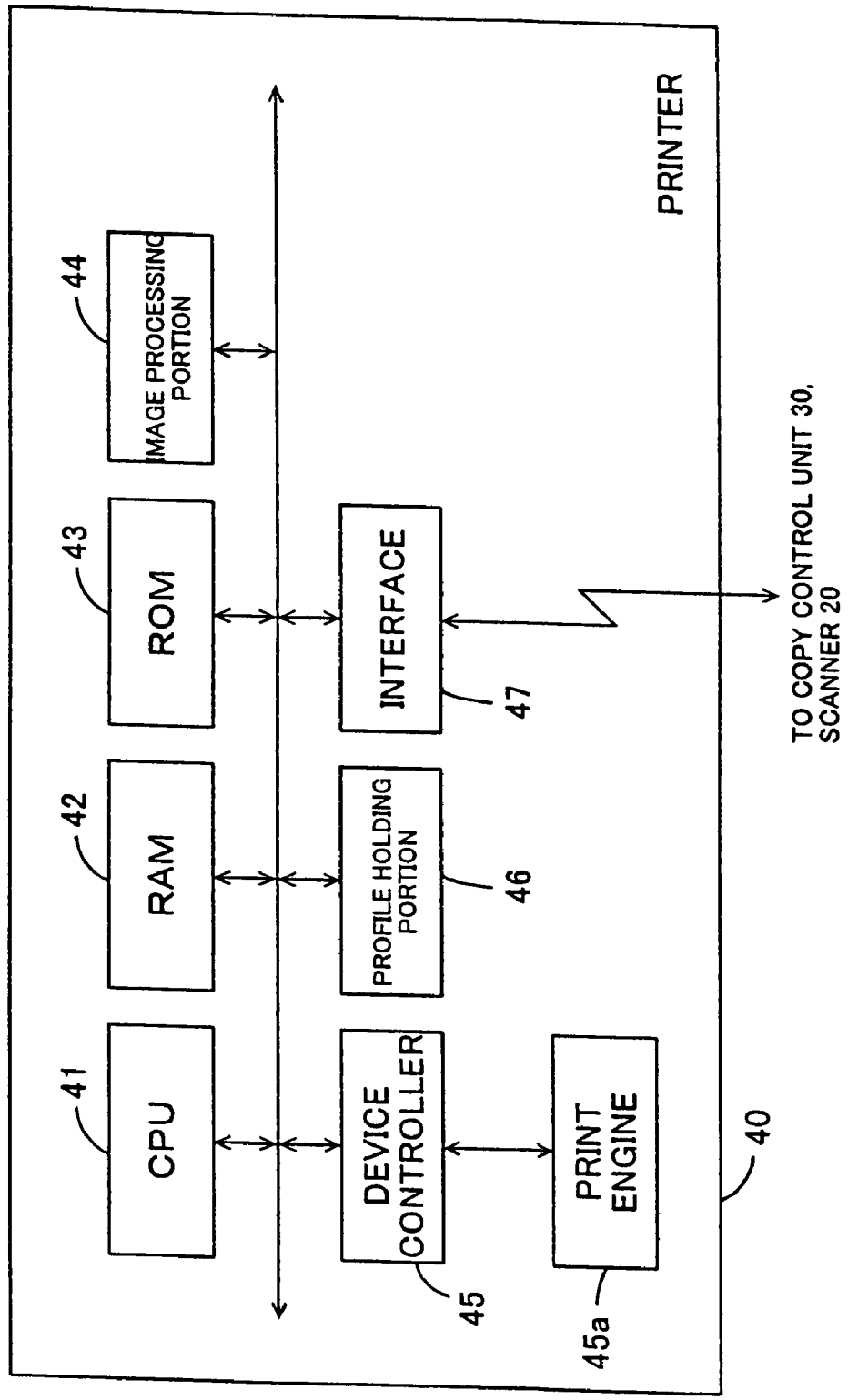
FIG. 4 is a block diagram of a printer.

FIG. 4 is a block diagram of the printer 40. In the drawing, the CPU 41 executes a control program stored in the ROM 43, while using the RAM 42 as work memory. Certain image processing is performed by an image processing portion 44 (custom IC or the like), and the process of recording a recording material onto the printing paper is carried out by the device controller 45 and the print engine 45a. Additionally, the printer 40 has an interface 47.

Specifically, on the basis of an instruction from the copy control unit 30, the CPU 41 is responsible for performing transfer of data and carrying out appropriate image processing; upon receiving image data from the image processing module 21e, it causes the image processing portion 44 to carry out processing of the output image data. The image processing portion 44 is an IC that carries out color conversion making reference to a profile, and a halftone process; it generates halftone data specifying recording material levels for outputting colors indicated by the image data output by the image processing module 21e.

While the recording material is not limited as to color, it is possible to employ CMYK (cyan, magenta, yellow, black) for example. In this case, the image processing portion 44, referring to a profile held in a profile holding portion 46, converts RGB color system image data into the CMYK color system. That is, gradation values that correspond to recording material usage levels for the colors CMYK is created from the original image data. The image processing portion 44 additionally reduces the gradation number of these gradation values to create halftone data.

While not shown in the drawing, the print engine 45a comprises a photoreceptor unit, exposure unit, developing unit, printer paper feed unit, and the like; in accordance with the halftone data, toner is transferred onto the photoreceptor, and the toner is then transferred and fused onto the printer paper to effect printing. The print engine 45a is controlled by the device controller 45, with the device controller 45 handling the halftone data and controlling the units so as to record the recording material in accordance with the halftone data.

Figure 5:
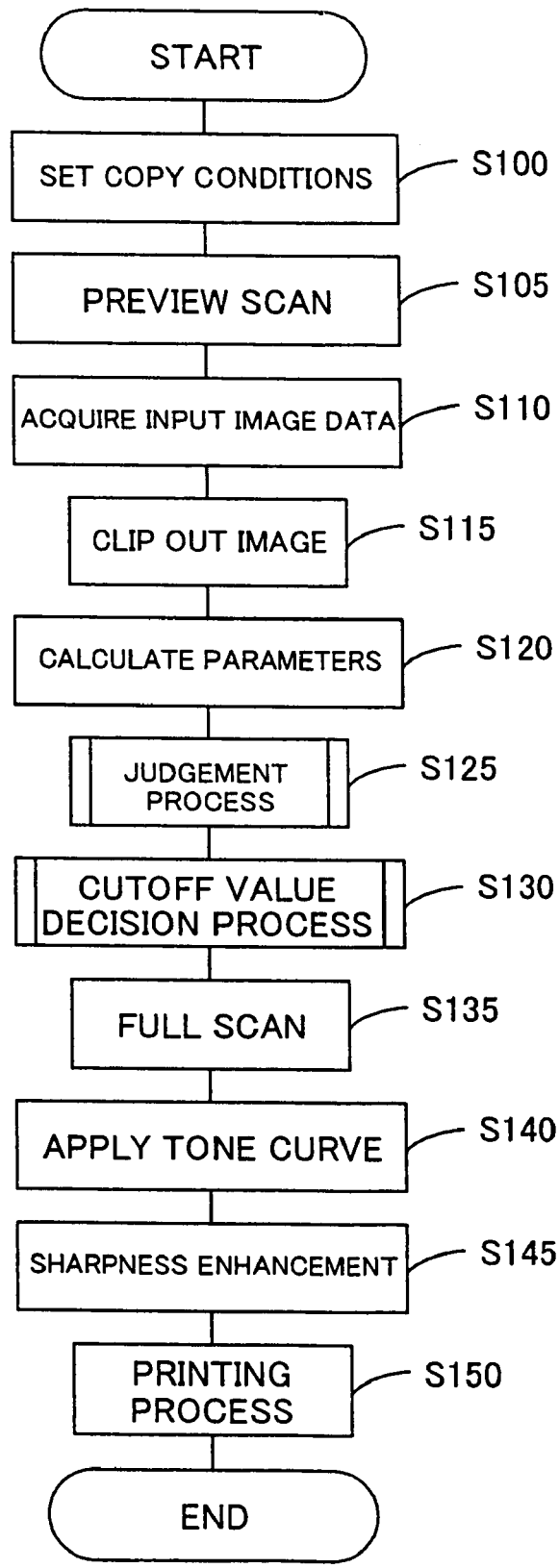
FIG. 5 is a general flowchart of a copying process.

(2) Copying Process:

The copying process in the copier 10 will now be described. FIG. 5 is a general flowchart of a copying process. During copying, first, while verifying the display content on the display portion 34, the user uses the control portion 35 to set the printing conditions (Step S100). Specifically, on the display portion 34 of the copy control unit 30 there is displayed an interface for selecting scanning conditions and printing conditions during copying, enabling the user to set the scanning conditions and printing conditions via the control portion while visually monitoring the interface.

It is possible to employ conditions of various kinds as scanning conditions, for example, setting scanning resolution and original document size. Likewise it possible to employ conditions of various kinds as printing conditions, for example, setting printing paper size, color during printing (i.e. to specify monochrome or color), or the like. Once copying conditions have been set, the CPU 31 outputs to the scanner 20 data indicating a Start Scan instruction. When this data is acquired in the scanner, the scan control module 21b shown in FIG. 2 outputs an instruction to the device controller 45, and the preview scan resolution specified in Step S100 is set. A preview process to scan the original document is then performed under control of the device controller 24 (Step S105).

The image data obtained in the preview is acquired by the scan control module 21b (Step S110). Clipping out of the image for analysis is then performed (Step S115). Specifically, since a scanned document is sometimes smaller than the area scanned by the scanner 20, the image on the document being scanned is analyzed, and a process to clip out an image corresponding to the original document is performed, for the purpose of printing. Here, it suffices to be able to clip out an image corresponding to the original document; it is possible to employ various processes for this purpose, such as detecting shadows produced at the borders of the document by light projected from the light source in the scanning portion 24a, in order to extract the borders of the document.

Once a target for analysis has been acquired through clipping out an image, a parameter needed in order to judge the type of image is calculated (Step S120). Once the parameter is calculated, the first judgment module 21c and the second judgment module 21d, using the parameter, carry out a judgment process to judge the type and sub-class of the clipped out image (Step S125). Once the type and sub-class of the image have been judged, a cutoff value decision process is carried out (Step S130).

Here, the cutoff value is a value use during the subsequent contrast enhancement process, for specifying a gradation value range ignored in shadow areas and highlight areas during contrast enhancement. Specifically, this is a process whereby during contrast enhancement, gradation values ranging from 0 to the shadow cutoff value are ignored; gradation values ranging from the highlight cutoff value to 255 are ignored; and the remaining gradation value range is reassigned gradation values of 0-255; with these cutoff values decided in Step S130.

Next, the scan control module 21b outputs an instruction to the device controller 24, and the full scan resolution specified in Step S100 is set. Then, under control by the device controller 24, the full scan process is carried out to scan the original document (Step S135). Since image type and sub-class have been determined for image data obtained in the full scan, the image processing module 21e applies a tone curve to the image data, depending on its sub-class (Step S140), and performs contrast enhancement. Additionally, the image processing module 21e carries out sharpness enhancement of the resultant image data, depending on the type of image (Step S145).

Contrast enhancement will be described in detail later. Sharpness enhancement is carried out by an appropriate process that depends on the type or sub-class of an image; in this embodiment, the process is carried out with a higher level of sharpness enhancement for images that include text, and a lower level of sharpness enhancement for images that include photographs. Specifically, since text by its very nature has distinct borders, text is represented more distinctly with a higher level of sharpness enhancement. In many instances, sharpness enhancement will improve appearance in natural images in photographs as well but if edges stand out to an extreme extent, appearance conversely suffers, so the level of sharpness enhancement is less than for text. Once image processing such as described above has been carried out, the image processing module 21*e* outputs the processed image data to the printer 40. In the printer 40, the image processing portion 44 etc. perform processing on the basis of the image data, and the printing process by the print engine 45*a* is carried out (Step S150).

Figure 6:
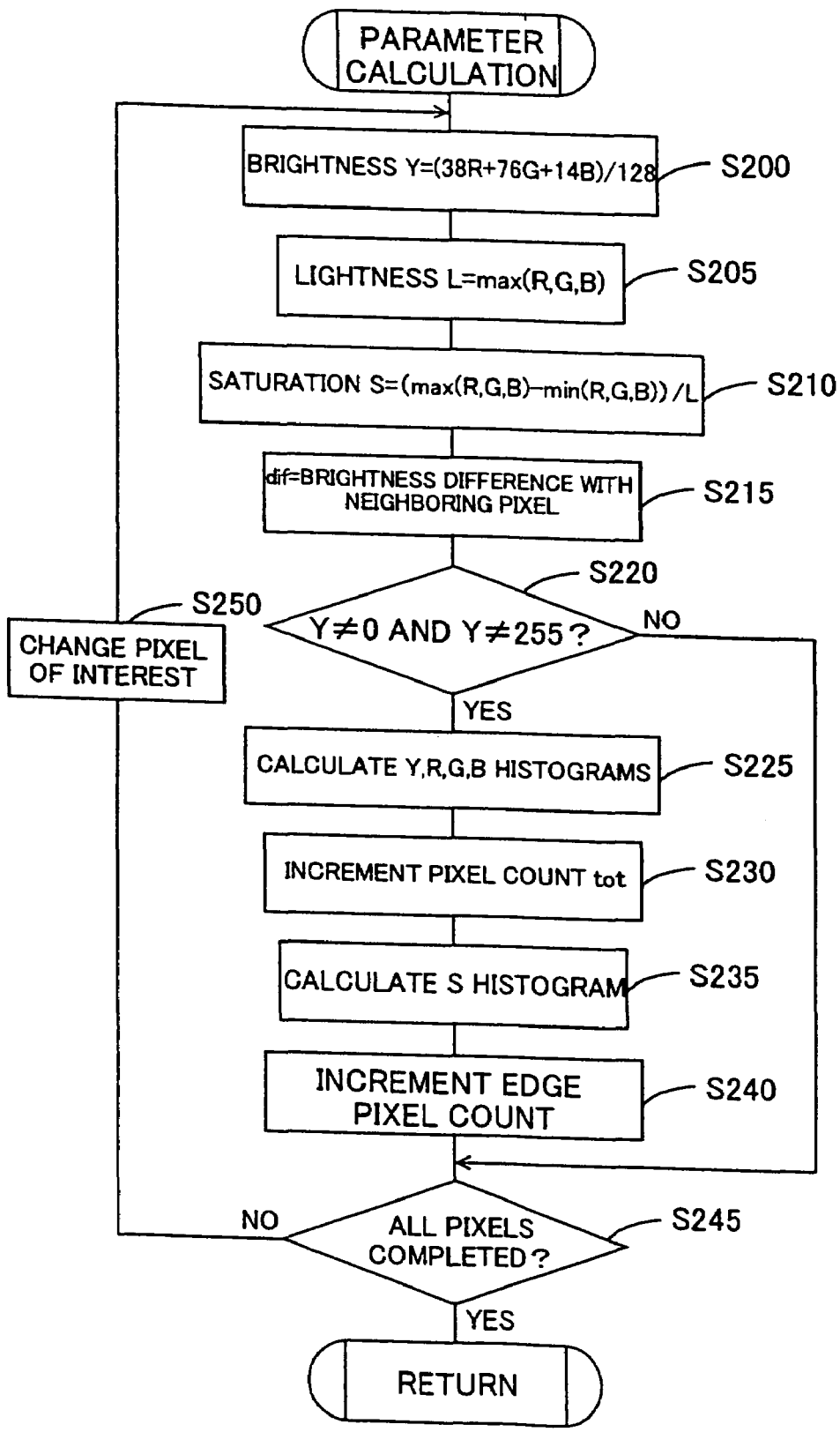
FIG. 6 is a flowchart of a parameter calculation process.

(2-1) Parameter Calculation Process:

Next, the parameter calculation process in Step S120 will be described in detail. FIG. 6 is a flowchart of a parameter calculation process. This process is carried out on a pixel-by-pixel basis, for image data after the preview scan; first, pixel brightness Y is calculated as Y=(38R+76G+14B)/128 (Step S200). Here, pixel-by-pixel brightness is calculated by means of a simple equation, but the method of calculating brightness is not limited to this equation, it being possible to employ various other methods. For example, a profile that specifies correspondence relationships among RGB gradation values and brightness values could be prepared in advance, and pixel-by-pixel brightness values derived by referring to the profile.

Next, maximum value of RGB gradation values (max(R, G, B)) is extracted, and pixel lightness L is determined (Step S205). Here, lightness is calculated by means of a simple method, but the method of calculating lightness is not limited to this equation, it being possible to employ various other methods. For example, a profile that specifies correspondence relationships among RGB gradation values and lightness values could be prepared in advance, and pixel-by-pixel lightness values derived by referring to the profile.

The difference between the maximum value of RGB gradation values (max(R, G, B)) and the minimum value of RGB gradation values (min(R, G, B)) is divided by the lightness L to determine pixel saturation s (Step S210). Here as well, saturation is calculated by means of a simple method, but the method of calculating saturation is not limited to this equation, it being possible to employ various other methods. For example, a profile that specifies correspondence relationships among RGB gradation values and saturation values could be prepared in advance, and pixel-by-pixel saturation values derived by referring to the profile.

Additionally, in order to identify whether a pixel is an edge pixel, a brightness difference dif with neighboring pixels is calculated (Step S215). In this embodiment, a pixel is defined as being an edge pixel if this brightness difference dif exceeds 60, but it would of course be possible to use some other number besides 60, or to detect edge pixels by using an edge detection filter or the like. In the process in FIG. 6, parameters are calculated on a pixel-by-pixel basis, repeating the process of calculating the parameters while changing the pixel of interest. Accordingly, the neighboring pixel, typically the pixel situated adjacent to the left of the current pixel of interest, is decided upon, and for an atypical pixel (in this case, a pixel at the left edge) a process such as comparison with a pixel other than that adjacent to the left is carried out. Of course, comparison with neighboring pixels is not limited to adjacent left, nor is the comparison target limited to a single pixel.

Next, in order to analyze the behavior of a characteristic quantity in the image overall while excluding maximum brightness and minimum brightness, it is judged whether the brightness Y of the pixel of interest is "0" or "255: (Step S220). In the event that brightness Y of the pixel of interest is neither "0" nor "255", Steps S225-S240 are skipped. If it is determined that brightness Y of the pixel of interest is neither "0" nor "255", gradation values are extracted for the each of the color components RGB, and gradation value frequency is incremented (Step S225). Specifically, by carrying out for all pixels a process of incrementing gradation value frequency for each pixel, histograms of brightness Y and the color components RGB are created.

Next, a predetermined variable tot is incremented (Step S230). Specifically, by incrementing tot in the course of the repeat process, there is acquired a pixel count of pixels whose brightness Y is neither "0" nor "255." Additionally, saturation s gradation values are extracted, and frequency of gradation value thereof is incremented (Step S235). That is, a histogram of saturation s is created. Additionally, pixels whose brightness difference dif exceeds 60 are extracted, and if exceeding, a variable created in advance for counting edge pixels is incremented (Step S240).

Once parameters have been calculated on a pixel-by-pixel basis in the above manner, a determination is made as to whether parameters have been calculated for all of the image data of the clipped out image (Step S245). When in Step S245 it is not determined that parameters have been calculated for all pixels, the pixel of interest is changed (Step S250), and the process starting at Step S200 is repeated. When in Step S245 it is determined that parameters have been calculated for all pixels, the calculated parameters are stored temporarily in RAM 22, the parameter calculation process is terminated, and the system returns to the process shown in FIG. 5.

Figure 7:
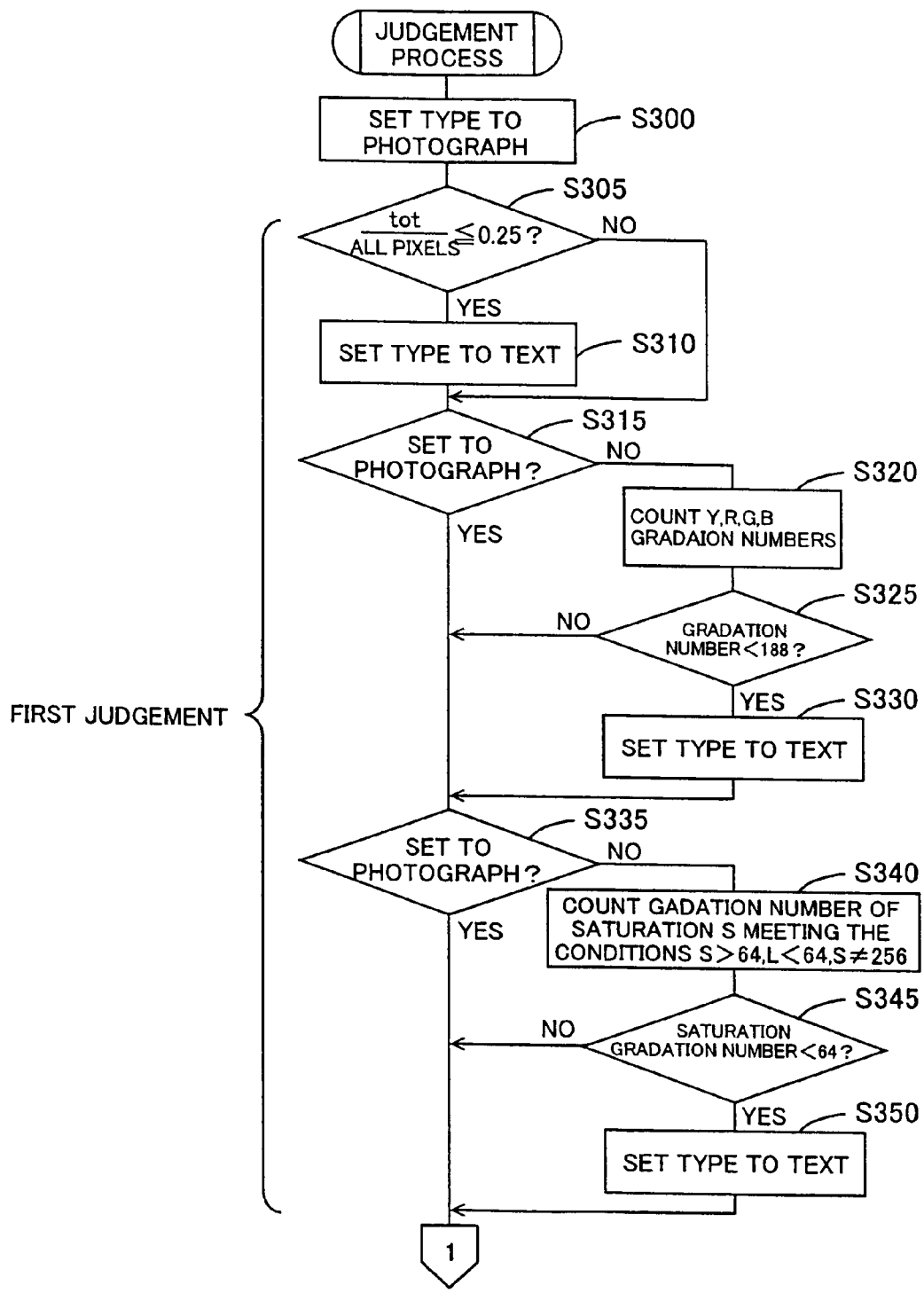
FIG. 7 is a flowchart of a judgment process for judging image type.
Figure 8:
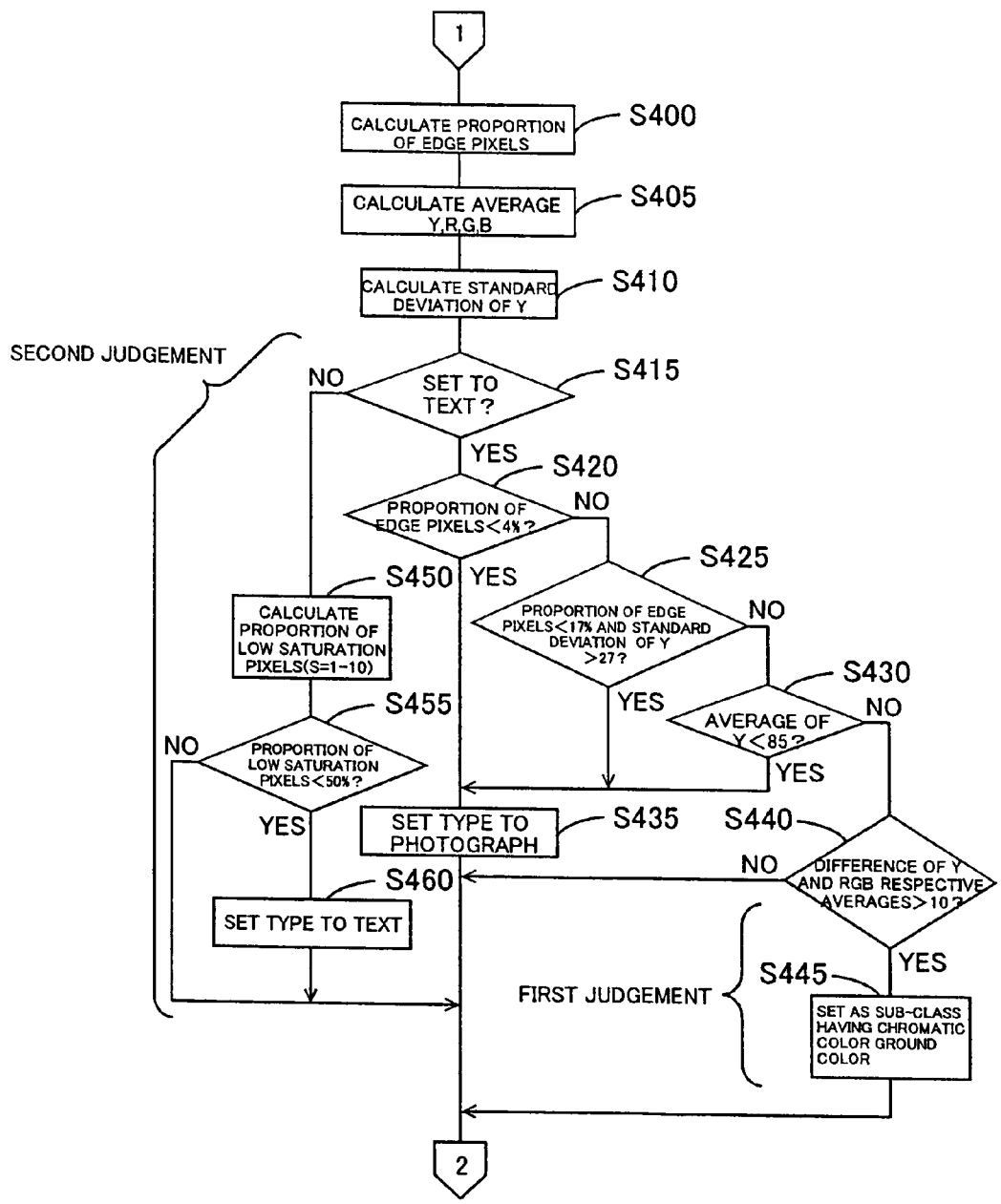
FIG. 8 is a flowchart of a judgment process for judging image type.
Figure 9:
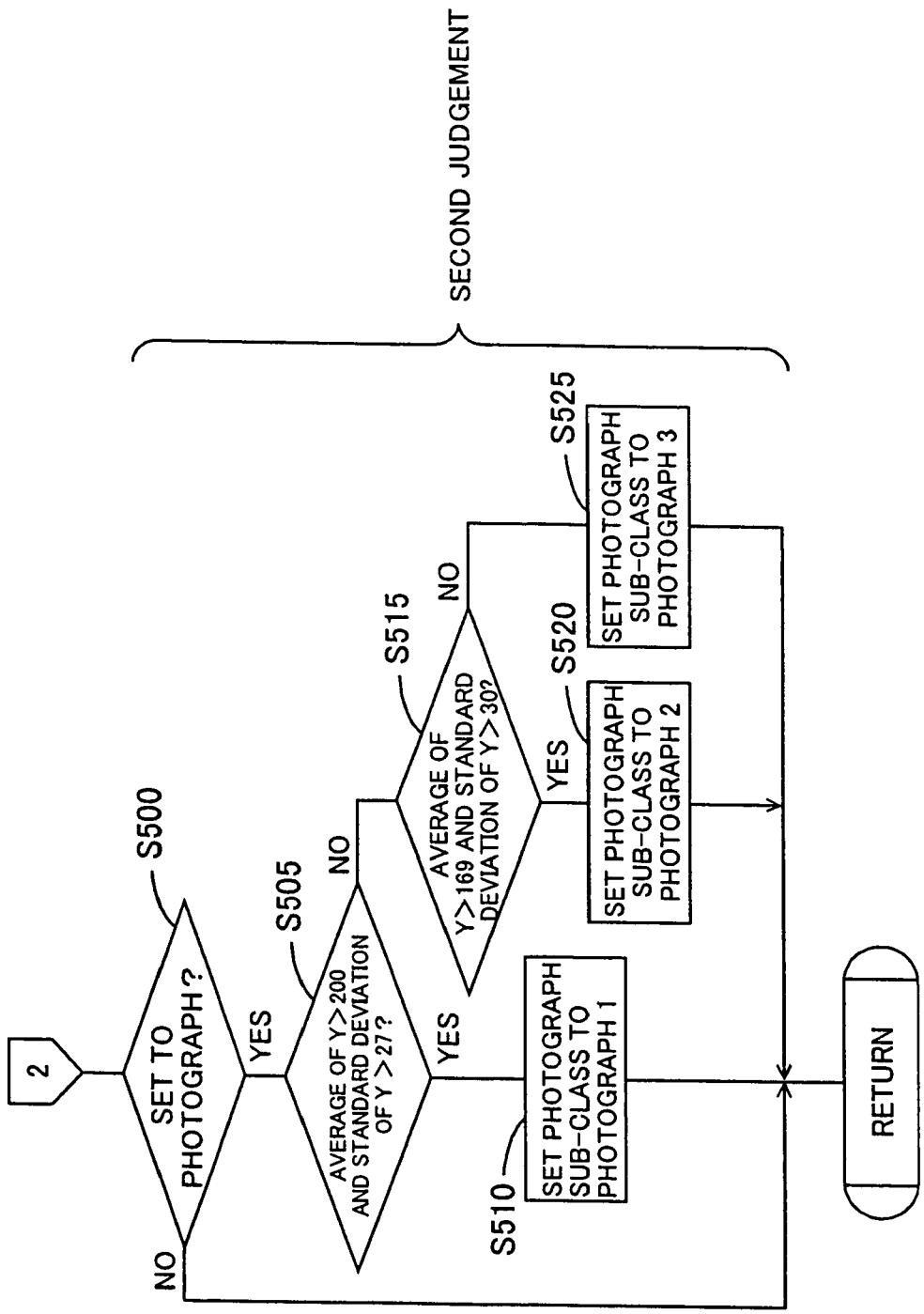
FIG. 9 is a flowchart of a judgment process for judging image type.

(2-2) Judgment Process:

Next, the judgment in Step S125 will be described in detail. FIGS. 7-9 are flowcharts of the judgment process. In this embodiment, a variable indicating photograph type and subclass are established, and by substituting this variable with a value indicating a judgment result, it is possible to subsequently refer back to the judgment result. Accordingly, first, the image type is set to photograph (Step S300). Next, on the basis of the pixels of maximum brightness and minimum brightness as a proportion of total pixels, it is judged whether the image type includes text.

Specifically, a determination as made as to whether dividing tot—which represents the total number of pixels excluding those of maximum brightness and minimum brightness—by the total number of pixels gives a result of 0.25 or less (Step S305). Specifically, since (tot/total pixels) represents a proportion based on total pixel count excluding pixels of maximum brightness and minimum brightness, a smaller proportion means that a greater number of pixels of maximum brightness and minimum brightness are included in the image data of the preview result.

Since pixels of maximum brightness are white and pixels of minimum brightness are black, it may be assumed that a typical image containing such pixels in large numbers will be one having black text formed on a white background. When in Step S305 it is determined that (tot/total pixels)≦0.25, image type is set to text (Step S310), whereas when in Step S305 it is not determined that (tot/total pixels)≦0.25, the process skips Step S310.

Next, referring the aforementioned variable, determination is made whether image type has been set to photograph (Step S315). When in Step S315 it is not determined to be the photograph setting, on the basis of brightness Y and color component RGB gradation number, determination is made as to whether the image is of an image type that includes text.

Accordingly, brightness Y and color component RGB gradation number is counted (Step S320), and it is determined whether gradation number is smaller than "188" (Step S325). When determined that gradation number is smaller than "188", the image type is set to text (Step S330).

Specifically, in text or other artificially created images, since color is determined artificially, gradation number tends to be smaller than with natural images. Accordingly, a typical upper limit for gradation number includable in text or other artificially created images is decided upon in advance, and by judging whether the gradation number of an image after preview is smaller than this gradation number, it is determined whether the image is text. Brightness Y and color component RGB gradation number can be calculated by referring to histograms. Specifically, gradation values whose frequency in a histogram is not "0" may be counted one by one, taking the sum.

After the process of Step S330, and when determined in Step S315 that the setting is photograph, when in Step S325 it is not determined that gradation number is smaller than "188", it is rejudged whether the setting is photograph (Step S335). If in this Step S325 it is not determined that the setting is photograph, on the basis of image saturation s, it is then determined whether the image is of a type that includes text. For this purpose, the gradation number of saturation s meeting the conditions s>64, L>64, and s≠256 is counted (Step S340), and it is determined whether gradation number is smaller than "64" (Step S345). If not determined that gradation number is smaller than "64", image type is set to text (Step S350).

Specifically, where chromatic color is used in an image created artificially, such as lines or patterns, color is selected artificially, and in virtually all cases colors of high saturation and lightness are used to improve appearance. Accordingly, a typical lower limit for gradation number includable in text or other artificially created images is decided upon in advance, and by judging whether saturation gradation number of an image after preview is smaller than this lower limit, it is determined whether the image is text or other artificially created image. Here as well, saturation gradation number can be calculated by referring to a histogram. Since saturation s=256 is white, this is excluded from the gradation number count.

In the above manner, by means of Steps S305, S310, Steps S320-S330, and Steps S340-S350, it is judged whether image type is text, and these process are equivalent to the first judgment step. After conducting judgment by means of the first judgment step in this way, judgment is conducted by means of the second judgment step.

FIG. 8 and FIG. 9 depict principally judgment by means of the second judgment step. In order to carry out the second judgment step, the second judgment module 21d calculates statistical indices of characteristic quantities in the image. For this purpose, in the first instance, the proportion of edge pixels is calculated (Step S400). Specifically, the proportion of edge pixels is derived by dividing the edge pixel count calculated in the aforementioned Step S240, by the pixel count tot calculated in the aforementioned Step S230. Additionally, averages of brightness Y and of color components RGB are calculated (Step S405). Here, the brightness average is a value derived by dividing the sum of brightness Y of each pixel by the pixel count tot; color component RGB averages are values derived by dividing the sum of each component RGB by the pixel count tot.

Standard deviation of brightness Y is calculated as well (Step S410). Specifically, the sum of squares of the difference between brightness Y of each pixel and the average value of brightness Y is taken, divided by the pixel count tot, and the square root taken. Once statistical indices have been calculated in the above manner, referring to the aforementioned variable, it is determined whether the setting is text (Step S415). When determined that the setting is text, in Step S420 and following it is checked whether the image is a photograph. That is, judgment is carried out by the second judgment module 21d in such a way that, even if the judgment of text is an erroneous judgment, the erroneous judgment can be definitively corrected.

For this purpose, firstly, it is determined whether the proportion of edge pixels is less than 4% (Step S420). That is, in most instances the borders of text or other artificially created image are edges, with the text etc. being enclosed by these edges. Accordingly, if image type is one composed of writing, drawings or the like, it will likely include a given proportion of edges. For this reason, the proportion of edge pixels is compared with a threshold value (in this embodiment, 4%), and when the proportion is smaller than the threshold value, image type is set to photograph (Step S435).

To provide certainty, in the second judgment module 21d, additional judgment is carried out on the basis of a different criteria. For this purpose, when in Step S420 it is not determined that the proportion of edge pixels is less than 4%, it is then further determined whether the proportion of edge pixels is less than 17%, and whether the standard deviation of brightness Y is greater than 27 (Step S425). That is, since a photograph contains high levels of continuous gradation change, the spread of the gradation value distribution is quite large, whereas text, drawings, and other such artificial images have small gradation number, so that the spread of the gradation value distribution is small. Thus, by referring to the standard deviation of brightness Y, which indicates the spread of the gradation value distribution, it can be decided that a wider distribution is closer to a photograph.

In the case of a photograph, edge pixels will tend to be fewer in number than a text image, as noted previously. Accordingly, in Step S425, the threshold value for determining the proportion of edge pixels is larger than in Step S420, and in association therewith the standard deviation of brightness Y is referred to as well, when judging whether the image is a photograph. Specifically, if in Step S425 it is determined that the proportion of edge pixels is smaller than 17% and that the standard deviation of brightness Y is greater than 27, in Step S435 the image type is set to photograph.

If in Step S425 it is not determined that the proportion of edge pixels is smaller than 17% and that the standard deviation of brightness Y is greater than 27, it is then determined whether the average of brightness Y is smaller than 85 (Step S430). That is, in most instances, text or other artificially created images have very light background (e.g. white). Even assuming that maximum brightness pixels have been eliminated in the manner described previously, if the background is light, may high brightness pixels will be contained. In the case of a picture, on the other hand, the background will not necessarily be light as compared to writing or the like. Accordingly, if average brightness is smaller than a threshold value (85 in this embodiment) it can be determined that the image is a photograph. Accordingly, if in Step S430 it is determined that the average of brightness Y is smaller than 85, in Step S435 the image type is set to photograph.

If in Step S430 it is not determined that the average of brightness Y is smaller than 85, the image type will be one that includes text; here, image types that include text are further classified into sub-classes. In this embodiment, image types that include text are classified into different sub-classes depending on whether ground color includes chromatic color, and for this purpose it is judged whether color is distributed disproportionately (Step S440). Specifically, the difference of the average value of brightness Y and the average value of color component R is calculated, and it is determined whether this difference exceeds 10. Similar judgments are made for the difference of the average value of brightness Y and the average value of color component G, and the difference of the average value of brightness Y and the average value of color component B.

Specifically, since brightness Y is a value that includes intensity of all of the color components RGB, the average of brightness Y and the color components are compared, and if the difference with any color component stands out appreciably, that color is distributed disproportionately in the image overall. Accordingly, in this embodiment, such disproportionate color distribution is detected depending on whether this difference exceeds 10; if in Step S440 it is determined that a color is distributed disproportionately, the image is classified in the sub-class of images that include text and that have chromatic color background (Step S445). If in Step S440 it is not determined that the difference exceeds 10, it is not placed in the sub-class of images that have a chromatic color background.

On the other hand, if in the aforementioned Step S415 it is not determined to be set to text, the image type will have been set to photograph, and starting with Step S450 it is checked whether this image is of image type that includes text. Specifically, judgment is performed by the second judgment module 21d so that even in the event that the judgment of being non-text is an erroneous judgment, the erroneous judgment can be corrected.

For this purpose, the proportion of low-saturation pixels (with saturation s of 1-10) is calculated (Step S450), and it is determined whether the proportion of low-saturation pixels exceeds 50% (Step S455). If in Step S455 it is determined that the proportion of low-saturation pixels exceeds 50%, the image type is set to text (Step S460), whereas if not determined to be in excess of 50%, Step S460 is skipped. Specifically, in an image having black text formed on a white background, since the background and text are achromatic colors, low-saturation pixels will be numerous. Utilizing this fact, in this embodiment, a threshold value (50%) is set for the proportion of low-saturation pixels, and by comparing the proportion of low-saturation pixels with this threshold, it is judged whether the image is of a type that includes text.

After the above process has been performed, for photograph images, the second judgment module 21d now classifies the image in a sub-class. In this embodiment, extremely light photograph images are classified in a sub-class designated Photograph 1, photograph images that are light overall but darker than Photograph 1 are classified in a sub-class designated Photograph 2, and other classes are classified in a sub-class designated Photograph 3.

For this purpose, first, referring to the aforementioned variable, it is determined whether the image has been set to photograph (Step S500). If not determined to have been set to photograph, Steps S505-S525 are skipped. If determined to have been set to photograph, it is then judged whether the average of brightness Y exceeds 200, and additionally whether the standard deviation of brightness Y exceeds 27 (Step S505). That is, where the average of brightness Y exceeds 200, the image is defined as being an extremely light image. In order to make judgment with greater certainty, the standard deviation of the photograph image is judged together with the average of brightness Y.

If in Step S505 it is determined that the average of brightness Y exceeds 200 and furthermore that the standard deviation of brightness Y exceeds 27, the aforementioned variable is set to indicate that the image is a photograph image of the sub-class Photograph 1 (Step S510). If in Step S505 it is not determined that the average of brightness Y exceeds 200 and that the standard deviation of brightness Y exceeds 27, it is then judged whether the average of brightness Y exceeds 169 and additionally whether the standard deviation of brightness Y exceeds 30 (Step S515).

Specifically, in the event that the average of brightness Y is not as high as 200 but exceeds 169, the image is deemed to be light overall. In this case as well, in order to make judgment with greater certainty, the standard deviation of the photograph image is judged together with the average of brightness Y. If in Step S515 it is determined that the average of brightness Y exceeds 169 and furthermore that the standard deviation of brightness Y exceeds 30, the aforementioned variable is set to indicate that the image is a photograph image of the sub-class Photograph 2 (Step S520). If in Step S515 it is not determined that the average of brightness Y exceeds 169 and that the standard deviation of brightness Y exceeds 30, the aforementioned variable is set to indicate that the image is a photograph image of the sub-class Photograph 3 (Step S525).

Once judgments have been made by the first judgment module 21c and the second judgment module 21d in the above manner, the routine returns to the process shown in FIG. 5. In the present invention, image type is judged with greater certainty by means of having judgment results of the first judgment module 21c rechecked by the second judgment module 21d. FIG. 10 is an illustrating depicting the advantage of performing a second judgment. The image shown in FIG. 10(a) is a photograph of a human subject. In such a photograph of a human subject, if the background and the clothing of the human subject are of similar, low-saturation color (e.g. color close to white), brightness Y, color component RGB, and saturation s gradation number in the image will be small.

Specifically, brightness Y and color component RGB gradation numbers may be smaller than the threshold value of 188 in the judgment of Step S325. Saturation gradation number may be smaller than the threshold value of 64 in the judgment of Step S345. Accordingly, while the first judgment module 21c may make the judgment that the image is text, this judgment is an erroneous judgment. Meanwhile, in this example, while distinct edges are present at the contours of the human subject and in the background, there are not many edges present in other areas. In particular, since the background and clothing are of similar color, the proportion of edge pixels will be even lower.

Accordingly, in the judgment by the second judgment module 21d, it is either determined in Step S420 that the proportion of edge pixels is 4% or less, or determined in Step S425 that proportion of edge pixels is 17% or less. Even where brightness Y gradation number is small, since the values thereof are spread apart, the standard deviation will easily exceed 27. As a result, in Step S420 or S425 it will be determined that the image is a photograph.

The image shown in FIG. 10(b) is an image of a TV program schedule, and is composed of text and lines. Accordingly, the image is of the type that includes text. However, the schedule also has chromatic color applied to the background and text, indicated by R1-R3, G1, G2 and B1-B3. Here, R1-R3 are red colors, G1 and G2 are green colors, and B1-B3 are blue colors. In the illustrated example, R1-R3, G1, G2 and B1-B3 are exemplary.

In an image of this kind, even if color on the original document is a single color, it is not the case that in the image data created by scanning the document, image data for areas of the same color will always be identical. Accordingly, brightness Y and RGB color component gradation number may exceed the threshold value of 188 in the judgment of Step S325. Also, saturation s gradation number may exceed the threshold value of 64 in the judgment of Step S345. Thus, in some instances the image will not be designated as including text, without passing through Step S330 or S350.

However, in such instances as well, the image can be correctly judged as being text by means of the judgments of Steps S415 and S450-S460. Specifically, even where the image includes chromatic color, the background of the image is achromatic color approximating white, and the text is achromatic color approximating black. Accordingly, in the judgment of Step S455 it will be determined that the proportion of low-saturation pixels exceeds 50%. As a result, the image will be judged as being one that includes text. In this way, in the case of an atypical image, it is possible for an erroneous judgment to be made, despite carrying out judgment in the first judgment module 21c on the basis of a characteristic feature quantity such as text. However, since further judgment is performed by the second judgment module 21d, image type can be judged with greater certainty.

In the above process, in Steps S420-S435 and Steps S455, S460, an erroneous judgment of the judgment of the first judgment module 21c is rechecked, and the process corresponds to judgment by the second judgment step. The process in Steps S440, S445 performs sub-classification for image types that include text, and thus corresponds to judgment by the first judgment step. The judgment by the second judgment module 21d is premised on a judgment having been previously made by the first judgment module 21c, and thus it is possible to set more stringent threshold values (4%, 17%, standard deviation of 27, and brightness average of 85 taught hereinabove).

Figure 11:
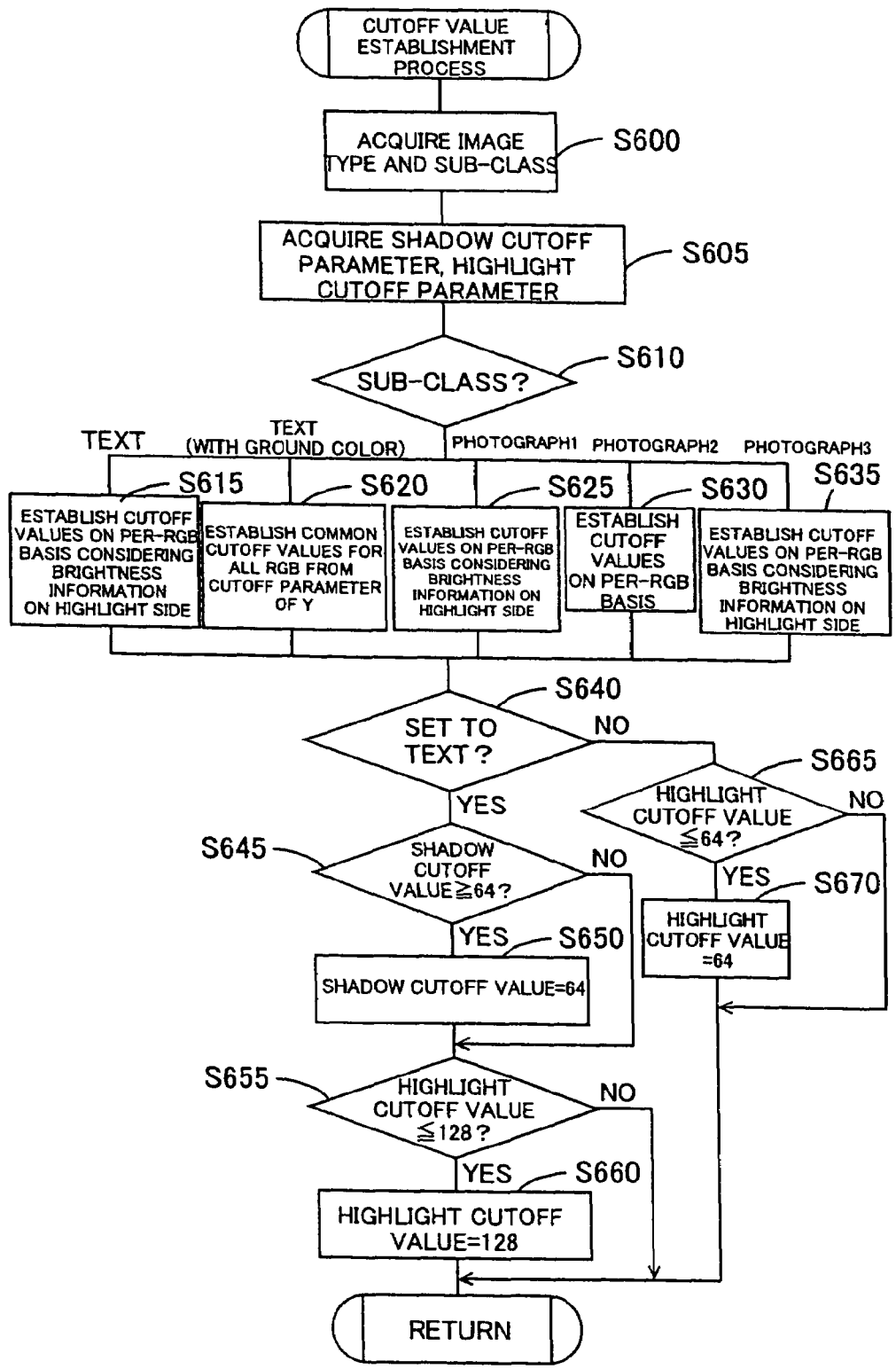
FIG. 11 is a flowchart of a cutoff value determination process.

(2-3) Cutoff Value Decision Process:

The cutoff value decision process in Step S130 will now be described in detail. FIG. 11 is a flowchart of a cutoff value decision process. In this embodiment, different contrast enhancement is carried out depending on individual image type and sub-class, and thus different cutoff values are used for individual sub-classes. First, making reference to the variable that indicates the aforementioned photograph type and sub-class, the type and sub-class of the previewed image are acquired (Step S600). Referring to the ROM 23, cutoff parameters (a shadow cutoff parameter and highlight cutoff parameter) corresponding to each sub-class are acquired (Step S605).

Cutoff parameters are parameters specifying proportions of pixels to be ignored for the shadow side and for the highlight side, during contrast enhancement; proportions could be specified as 1% on the shadow side and 50% on the highlight side, for example. In this example, it is indicated that 1% of pixels on the shadow side are ignored and 50% of pixels on the highlight side are ignored; more specifically, cutoff values for histograms of the RGB color components are specified in by the following process.

For this purpose, the aforementioned variable is referred to in order to determine the sub-class of the image (Step S610), and if not classified into the sub-class of text images with ground color, Step S615 is performed, or if classified into the sub-class of text images with ground color, Step S620 is performed. If the image type is a photograph and the sub-class is Photograph 1, Step S625 is performed; if the image type is a photograph and the sub-class is Photograph 2, Step S630 is performed; or the image type is a photograph and the sub-class is Photograph 3, Step S635 is performed.

Figure 12:
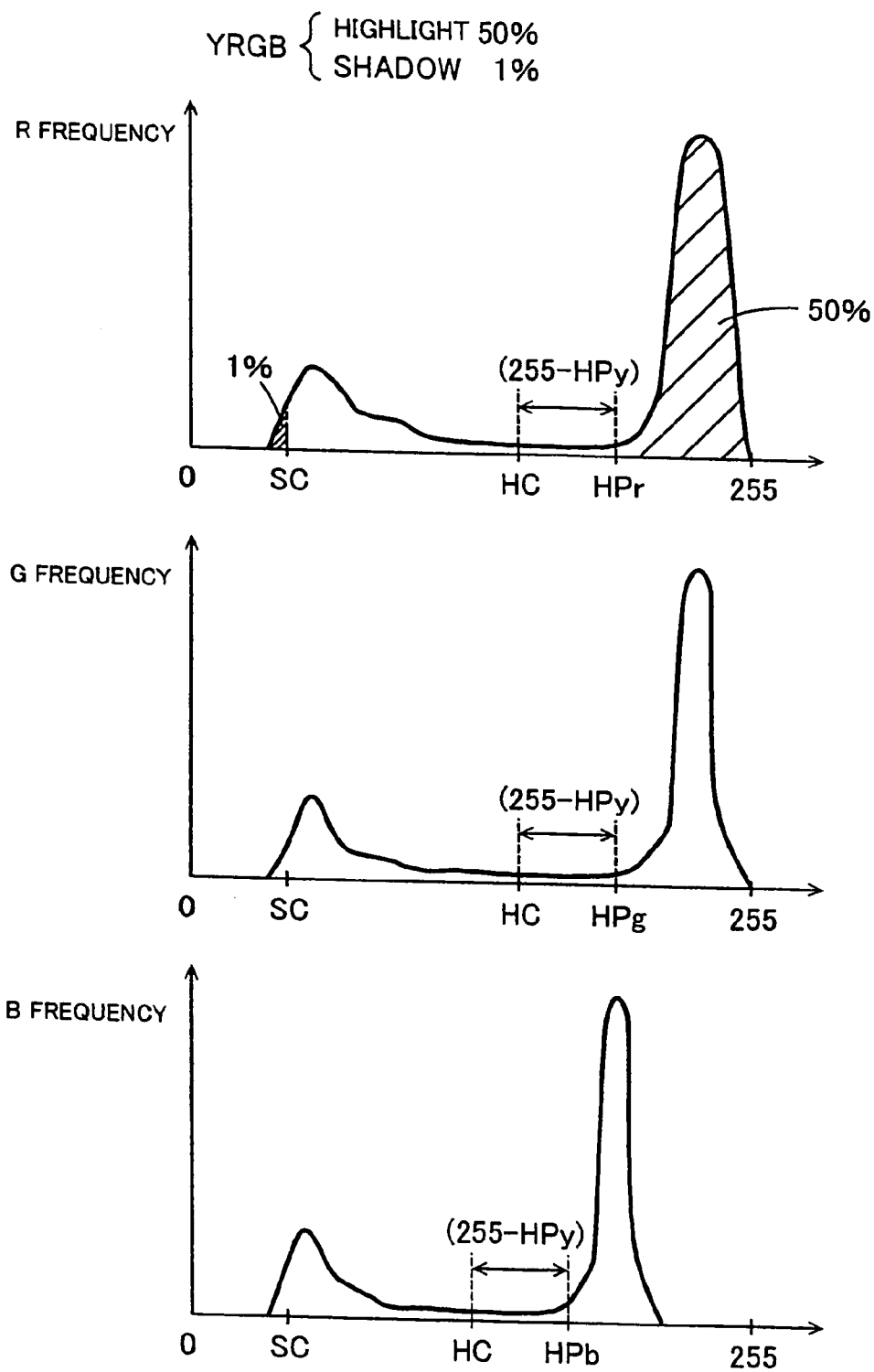
FIG. 12 is an example of histograms in a text image.

In Step S615, individual cutoff values are decided upon for each of the RGB components coupled with information about brightness Y on the highlight side. FIG. 12 is an example showing typical histograms for each of the RGB color components of an image not classified into the sub-class of text images having ground color. In all of the histograms for the RGB color components, a large peak appears on the highlight side, and a small peak appears on the shadow side.

The peak on the shadow side reflects the result of scanning text, while the peak on the highlight side reflects the white background. That is, these histograms are typical of an image having black text formed on a white background. In this instance, it will be preferable to perform contrast enhancement so that the brightest background becomes white and the darkest text becomes black; thus, in Step S615 cutoff values are selected such that contrast enhancement is carried out in this manner.

Specifically, in this sub-class, the highlight cutoff parameter is set to 50% and the shadow cutoff parameter to 1%, and these parameters are used to establish cutoff values for each of the RGB components. For the R component shown at top in FIG. 12, on the basis of the shadow cutoff parameter of 1%, there is established a shadow cutoff value SC such that the pixel count of pixels included in the segment from the minimum value to the shadow cutoff value SC in the R component histogram equals 1% of the total.

On the highlight side, on the basis of the highlight cutoff parameter of 50%, there is first established a provisional cutoff value HPr such that the pixel count of pixels included in the segment from the maximum value to the provisional cutoff value HPr in the histogram equals 50% of the total. Similarly, for the histogram of brightness Y, on the basis of the highlight cutoff parameter of 50%, there is first established a provisional cutoff value HPy such that the pixel count of pixels included in the segment from the maximum value to the provisional cutoff value HPy in the histogram equals 50% of the total. The difference between gradation value 255 and the provisional cutoff value HPy is then subtracted from the provisional cutoff value HPr, to establish a highlight cutoff value HC.

Processes similar to the above process are carried out to establish cutoff values for the G component and the B component as well. That is, for sub-classes not judged to be text images with ground color, cutoff values are established on the basis of individual RGB histograms, with cutoff values differing for each of the RGB components. Even with such cutoff values, since no color cast is present in the background, the contrast enhancement process can be carried out without throwing off color balance.

The reason for setting the highlight cutoff parameter to 50% and ignoring a large number of pixels on the highlight side is intended to whiteout the background; once a provisional cutoff value has been established for each color component, a provisional cutoff value calculated from brightness Y is used to establish a highlight cutoff value HC so as produce greater cutoff. Accordingly, the background may be definitively rendered white.

In contrast adjustment carried out in the aforementioned Step S140, contrast is enhanced by applying a tone curve that associates the shadow cutoff value SC with a gradation value of "0" and the highlight cutoff value HC with a gradation value of "255." Of course, the tone curve may have a shape such as a Y curve, an S shaped curve, or a straight line. This applies to the sub-classes described hereinbelow as well.

Figure 13:
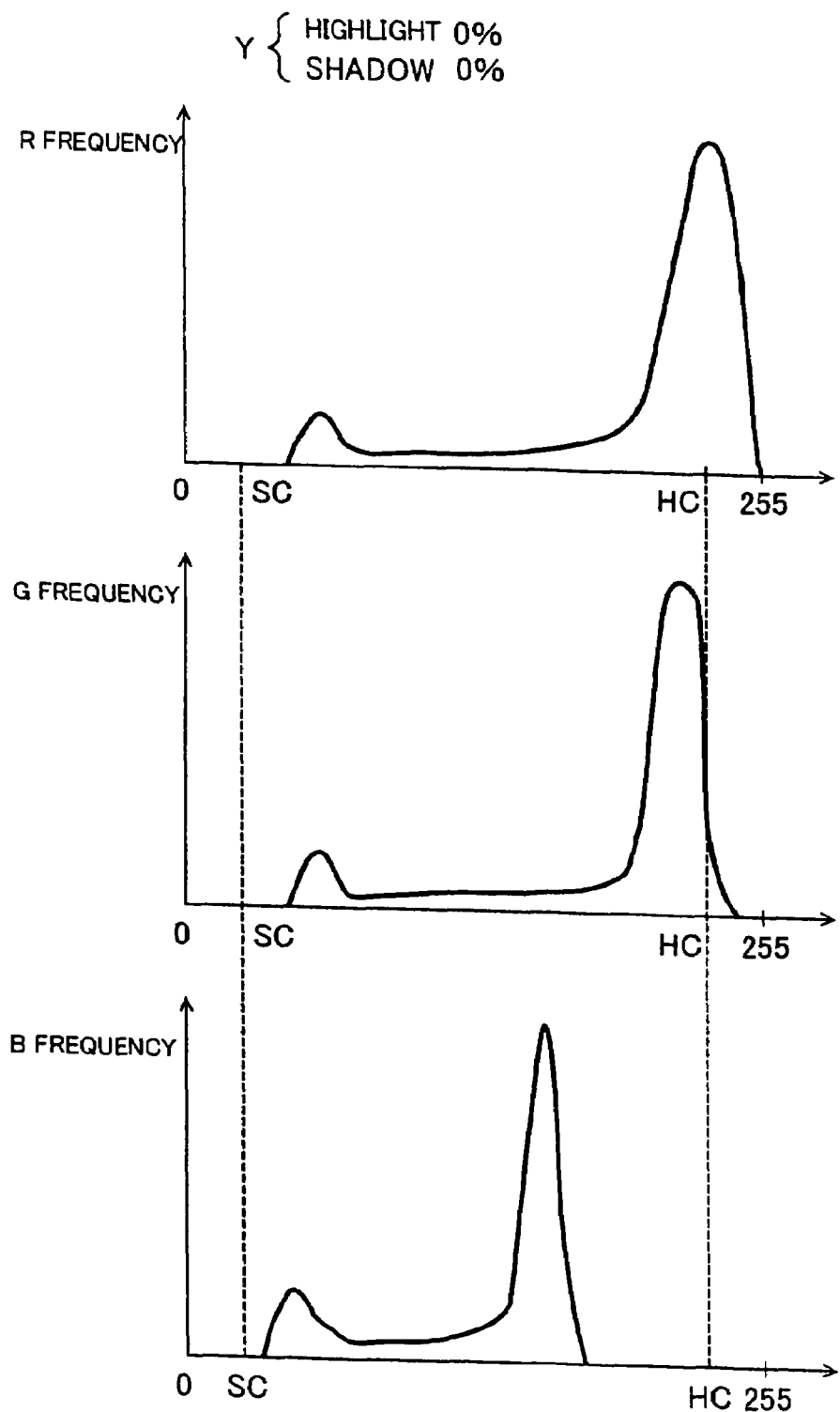
FIG. 13 is an example of histograms in a text image with ground color.

In Step S620, from the cutoff parameter of brightness Y, there is established a common cutoff value for all of the color components RGB. FIG. 13 is an example of histograms for the RGB color components of an image classified into the sub-class of text images having ground color. In the histograms for the R and G color components, a large peak appears on the highlight side, whereas in the B component, the peak on the highlight side is a gradation value smaller than the R and G components. Accordingly, the highlight area (background) of this image has a chromatic color cast (yellow in this example). While peaks are also present on the shadow side, these are peaks formed by black text. That is, this histogram is typical of an image having black text formed on chromatic ground color.

In this case, if the background, which has the highest brightness in the image, were rendered white, the background color would be altered; for this reason, there is established a cutoff value that is common to all of the RGB color components and that avoids causing excessive whiteout. Specifically, in this sub-class the highlight cutoff parameter is 0% and the shadow cutoff parameter is 0%, with the cutoff value being determined by applying these parameters to brightness Y only. That is, in this sub-class, it is preferable to establish the cutoff value based on brightness Y coupled with information for all color components, by means of establishing the cutoff value affected only by a specific color.

In this embodiment, both the highlight and shadow cutoff parameters are set to 0%, so the maximum value in the histogram of brightness Y is the highlight cutoff value HC, and the minimum value in the histogram of brightness Y is the shadow cutoff value SC. That is, in the sub-class of text images with ground color, contrast enhancement is carried out while preserving color balance as a common cutoff value for all of the RGB components.

In Step S625 and Step S635, the cutoff value is established in the same manner as in the aforementioned Step S615. Specifically, cutoff values are established individually for each of the RGB components, coupled with information about brightness Y on the highlight side. However, as the predetermined cutoff parameters differ for each sub-class, the established cutoff values per se will differ.

Figure 14:
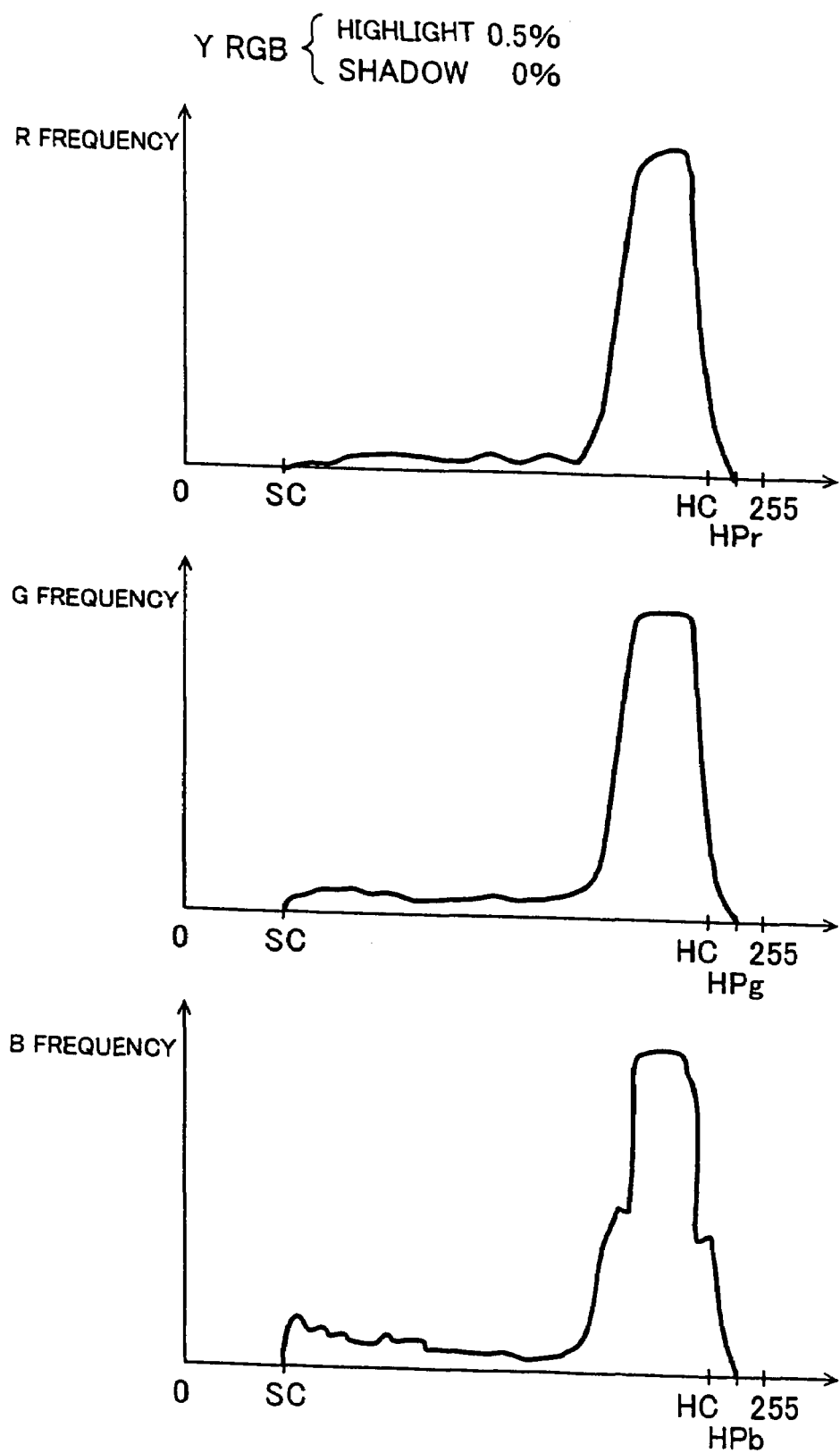
FIG. 14 is an example of histograms in a photograph image which is a very light image.

FIG. 14 is an example showing typical histograms for each of the RGB color components of a photograph image that is extremely bright. In these histograms, a large peak is present on the highlight end in all of the RGB color components, but there is no particularly noticeable peak on the shadow side. While this example is a photograph image, since average brightness is extremely high, in this embodiment, the image background is viewed as being white.

Accordingly, in Step S625, cutoff values are established so that the maximum brightness background becomes white, while preserving tonality in shadow portions. Specifically, in this sub-class (Photograph 1), the highlight cutoff parameter is 0.5% and the shadow cutoff parameter is 0%, with these parameters being used to establish the cutoff values for each of the RGB components. As shown in FIG. 14, in shadow portions, the minimum value of the histograms of the RGB components is the shadow cutoff value SC.

On the highlight side, on the basis of the highlight cutoff parameter being 0.5%, provisional cutoff values HPr, HPg, HPb are established from maximum values of the histograms for the RGB components. Next, for the histogram of brightness Y, on the basis of the highlight cutoff parameter being 0.5% there is established a provisional cutoff value HPy such that the pixel count of pixels included in the segment from the maximum value to the provisional cutoff value HPy in the histogram equals 0.5% of the total.

The difference between gradation value 255 and the provisional cutoff value HPy is then subtracted from the provisional cutoff values HPr, HPg, HPb, to establish a highlight cutoff value HC for each of the RGB components. That is, in a photograph image that is also an extremely bright image, the background is considered to be white, while cutoff values are established in consideration of highlight cutoff parameters of brightness Y and each of the RGB components on the highlight side. By so doing, whiteout can be produced reliably, and background color eliminated.

Figure 16:
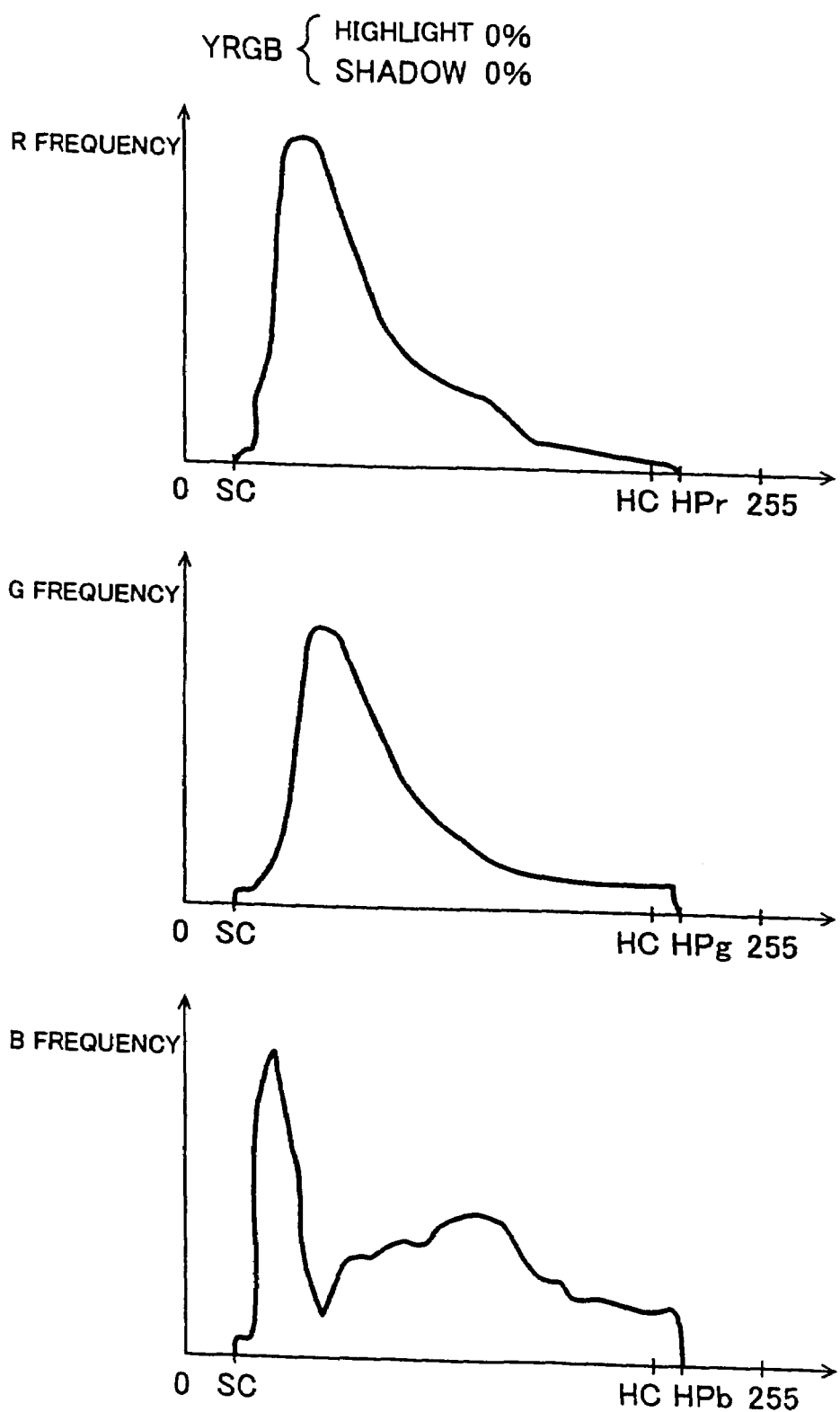
FIG. 16 is an example of histograms in an ordinary photograph image.

FIG. 16 is an example showing typical histograms for each of the RGB color components of an image of the Photograph 3 sub-class. This image includes a typical photograph where the sub-class is neither Photograph 1 or Photograph 2. In this image, there are no particular features of note in the histograms. Accordingly, in Step S635, contrast enhancement is performed in such a way as to avoid loss of overall tonality, as much as possible.

Specifically, in this sub-class (Photograph 3), the highlight cutoff parameter is 0% and the shadow cutoff parameter is 0%, with these parameters being used to establish the cutoff values for each of the RGB components. As shown in FIG. 16, in shadow portions, the minimum value of the histograms of the RGB components is the shadow cutoff value SC.

On the highlight side, on the basis of the highlight cutoff parameter being 0, provisional cutoff values HPr, HPg, HPb are established from maximum values of the histograms for the RGB components. Next, for the histogram of brightness Y, on the basis of the highlight cutoff parameter being 0%, there is established a provisional cutoff value HPy such that the pixel count of pixels included in the segment from the maximum value to the provisional cutoff value HPy in the histogram equals 0.5% of the total.

The difference between gradation value 255 and the provisional cutoff value HPy is then subtracted from the provisional cutoff values HPr, HPg, HPb, to establish a highlight cutoff value HC for each of the RGB components. That is, in an ordinary image, cutoff values are established so as to minimize cutoff of highlight portions, and contrast enhancement is carried out while preserving original gradation to the greatest extent possible.

Figure 15:
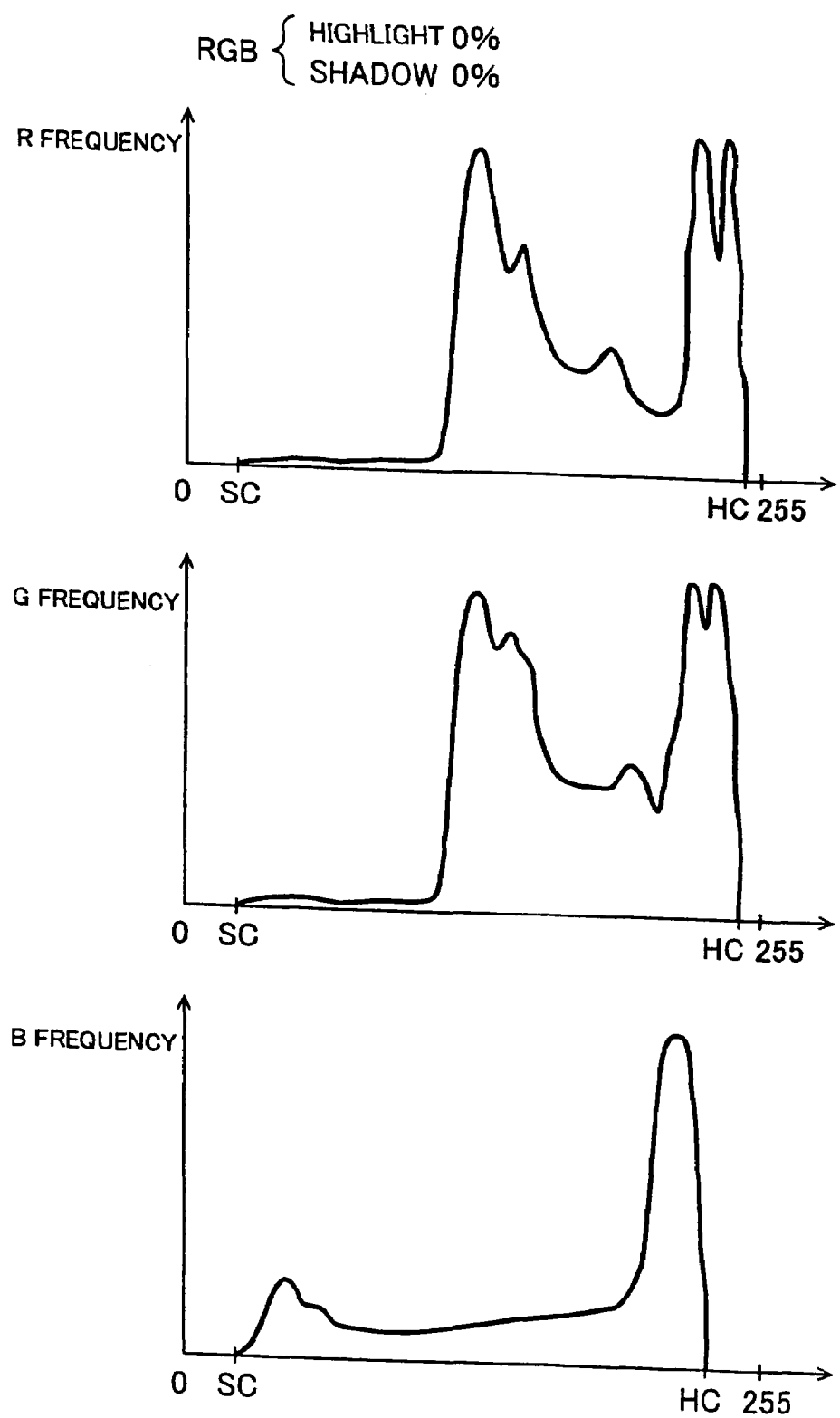
FIG. 15 is an example of histograms in a photograph image which is a light image.

In Step S630, cutoff values are established individually for each of the RGB components, without being coupled with brightness Y information. FIG. 15 is an example showing histograms for RGB color components in the Photograph 2 sub-class of images that are light overall but not as light as the Photograph 1 sub-class. In these histograms, while large peaks are present at the highlight side in all of the RGB color components, the peaks are not restricted to the highlight end, but appear also in the middle gradations.

In this embodiment, cutoff values are established so as to carry out contrast enhancement while holding down whiteout in the image. Specifically, in this sub-class the highlight cutoff parameter is 0% and the shadow cutoff parameter is 0% with no dimension of brightness information, so the shadow cutoff value SC is the minimum value in the histograms of the color components and the highlight cutoff value is the maximum value in the histograms of the color components. That is, with Photograph 2, contrast is enhanced while suppressing excessive whiteout in highlights.

Once cutoff values have been established in Steps S615-S635 in the above manner, in Steps S640-S670 modification is performed for the purpose of preventing pixels from being ignored excessively. This modification is based on threshold values that differ between image types that include text and image types that include photographs. For this purpose, first, it is determined whether image type has been set to text (Step S640). If determined that it has been set to text, it is then determined whether the shadow cutoff value is 64 or above (Step S645), and if the shadow cutoff value is 64 or above, the shadow cutoff value is set to 64 (Step S650).

If in Step S645 it is not determined that the shadow cutoff value is 64 or above, Step S650 is skipped. That is, an upper limit of 64 is imposed on the shadow cutoff value. By so doing, in the event that pixels on the shadow side are few in number but represent significant pixels, it is possible to prevent these pixels from being ignored. A hypothetical instance of significant pixels that are few in number would be one in which small amount of black text is present.

Next, it is determined whether the highlight cutoff value is 128 or less (Step S655), and if the highlight cutoff value is 128 or less, the highlight cutoff value is set to 128 (Step S660). In Step S655, if not determined that the highlight cutoff value is 128 or less, Step S660 is skipped. That is, a lower limit of 128 is imposed on the highlight cutoff value. By so doing, it is possible to prevent pixels from being ignored excessively on the highlight side.

If on the other hand, if it is determined in Step S640 that the image type has been set to text, it is then determined whether the highlight cutoff value is 64 or less (Step S665), and if the highlight cutoff value is 64 or less, the highlight cutoff value is set to 64 (Step S670). If it is not determined in Step S665 that the highlight cutoff value is 64 or less, Step S670 is skipped. That is, a lower limit of 64 is imposed on the highlight cutoff value. By so doing, it is possible to prevent pixels from being ignored excessively on the highlight side, resulting in whiteout. Once cutoff values have been established in the above manner, the routine returns to the process shown in FIG. 5.

(3) Other Embodiments

The embodiment set forth hereinabove is merely an example for realizing the invention, and it is possible to employ various other arrangements. For example, whereas in the preceding embodiment, the CPU 21 of the scanner 20 carries out the process of judging image type and image processing depending on the result of the judgment, it would be possible for these processes to be carried out by the CPU 31 of the copy control unit 30 or the CPU 41 of the printer 40 instead. Of course, besides an arrangement in which a CPU carries out processes according to a specific program, a custom IC for realizing the invention could be produced instead.

Additionally, while in the embodiment described above the invention is realized with copier 10 composed of an integrated scanner 20 and printer 40, it would also be possible to connect a scanner to an ordinary computer, and to have the ordinary computer carry out the process of judging image type and image processing depending on the result of the judgment. Of course, the recording material used in the printer 40 is not limited to four colors, and the printer could be an ink-jet printer.

Further, in the sense that the second judgment is carried out for the purpose of remedying an erroneous judgment in the first judgment, it is not essential to initially judge whether an image type is one that includes text. That is, initially it could be judged whether an image type is one that includes a photograph, followed by a judgment of whether the image type is one that includes text.

Although the present invention has been described and illustrated in detail, it is clearly understood that the same is by way of illustration and example only and is not to be taken by way of limitation, the spirit and scope of the present invention being limited only by the terms of the appended claims. The disclosure of Japanese Patent Application No. 2004-273371 filed Sep. 21, 2004 including specification, drawings and claims is incorporated herein by reference in its entirety.

What is claimed is:

1. An image processing method for judging image type, the method comprising:

inputting image data through an image data input portion of an image processing device;

a first judging by a first judgment portion of the image processing device of whether the type of image indicated by said image data is a first type; and a second judging by a second judgment portion of the image processing device of image data having been judged as being of said first type, as to whether the type of image is a second type, wherein in at least one of the first judging and the second judging, a given image type is further finely classified into sub-classes and different image processing for each sub-class is provided by the image processing device, and in either the first judging or the second judging, a certain criterion component and a chromatic color component are compared in order to judge whether a specific chromatic color component is distributed disproportionately, and image type is classified into a sub-class depending on whether disproportion is present.

2. The image processing method according to claim 1, wherein an image that has been classified by either the first judging or the second judging into a sub-class indicating that a specific chromatic color component is distributed disproportionately is subjected to image processing to change the color components by a degree of change common to a plurality of color components; and an image not classified into this sub-class is subjected to change of color components individually for a plurality of color components.

3. The image processing method according to claim 1, an image judged by either the first judging or the second judging as being of an image type that includes an artificially created image, and that is not classified into this sub-class indicating that a specific chromatic color component is distributed disproportionately, is subjected to image processing for changing color components while converting pixels in a certain high brightness range to maximum brightness, and converting pixels in a certain low brightness range to minimum brightness.

* * * * *